(12) United States Patent
Frusciano

(10) Patent No.: US 10,102,740 B2
(45) Date of Patent: Oct. 16, 2018

(54) REMOTE CONTROLLER AND SELECTIVE KEY ILLUMINATION

(71) Applicant: Time Warner Cable Enterprises LLC, St. Louis, MO (US)

(72) Inventor: Douglas Frusciano, Lafayette, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 17 days.

(21) Appl. No.: 15/018,997

(22) Filed: Feb. 9, 2016

(65) Prior Publication Data
US 2017/0229008 A1 Aug. 10, 2017

(51) Int. Cl.
G08C 17/02 (2006.01)
G08C 19/12 (2006.01)
(Continued)

(52) U.S. Cl.
CPC ............ *G08C 17/02* (2013.01); *G08C 23/00* (2013.01); *G08C 23/04* (2013.01); *H04N 5/4403* (2013.01);
(Continued)

(58) Field of Classification Search
CPC .... G06K 17/0022; G08C 17/00; G08C 17/02; G08C 2201/30; G08C 2201/32; G08C 2201/34; G08C 2201/94; G08C 23/04; G06Q 20/3415; G06Q 30/0254; G06Q 30/0255; G06Q 30/06; G07F 17/0014; G07F 7/1008; G08B 5/36; G08B 25/006; H04N 2005/4428; H04N 21/42222; H04N 21/42225; H04N 5/4403; H04N 21/4126; H04N 21/43615; H04N 21/43637; H04N 21/4367; H04N 21/472; H04N 21/6587; H04N 21/42204; H04N 21/26613; H04L 12/2809; H04L 12/282; H04L 12/2834; H04L 63/083; H04L 67/16; A61B 17/1626; A61B 17/32; A61F 9/007; F24F 11/0009; F24F 11/0012; F24F 2011/0013; F24F 2011/0068; G05B 19/02; G07C 9/00944; H01H 13/70; H01H 2219/036;
(Continued)

(56) References Cited

U.S. PATENT DOCUMENTS

2002/0084929 A1 * 7/2002 Stefanik ................. G08C 17/00
341/176
2011/0181386 A1 * 7/2011 Lee ......................... G08C 17/00
340/4.3

* cited by examiner

*Primary Examiner* — Dionne H Pendleton
(74) *Attorney, Agent, or Firm* — Armis IP Law, LLC

(57) ABSTRACT

According to one configuration, a remote controller device wirelessly controls a remote media system. The remote controller device includes multiple selectable control buttons, multiple optical sources, and controller hardware. Each optical source individually back-illuminates a respective selectable control button of the multiple selectable buttons. The controller hardware selectively activates different groupings of the multiple optical sources depending upon a current operational mode of the remote media system. For example, a respective user of the remote controller device selects a particular button of the remote controller device corresponding to the first operational mode. The remote controller device, in turn, transmits a wireless signal to the remote media system to control the remote media system to the first operational mode. Rather than illuminating all buttons, the remote controller device then back-illuminates only a relevant group of multiple selectable control buttons applicable to the first operational mode.

27 Claims, 14 Drawing Sheets

(51) Int. Cl.
  *G05B 19/02*  (2006.01)
  *G08C 23/00*  (2006.01)
  *H04N 5/44*  (2011.01)
  *G08C 23/04*  (2006.01)
  *H04N 21/422*  (2011.01)

(52) U.S. Cl.
  CPC ... *H04N 21/4221* (2013.01); *H04N 21/42222* (2013.01); *G08C 2201/00* (2013.01); *G08C 2201/30* (2013.01); *G08C 2201/34* (2013.01); *H04N 2005/4405* (2013.01); *H04N 2005/4444* (2013.01)

(58) Field of Classification Search
  CPC ......... H01H 2219/039; H01H 2223/04; H01H 2231/032; H01H 2231/042; H01H 2239/058; H01H 9/0235; H05B 37/0272; H05B 37/029; H04W 12/04
  See application file for complete search history.

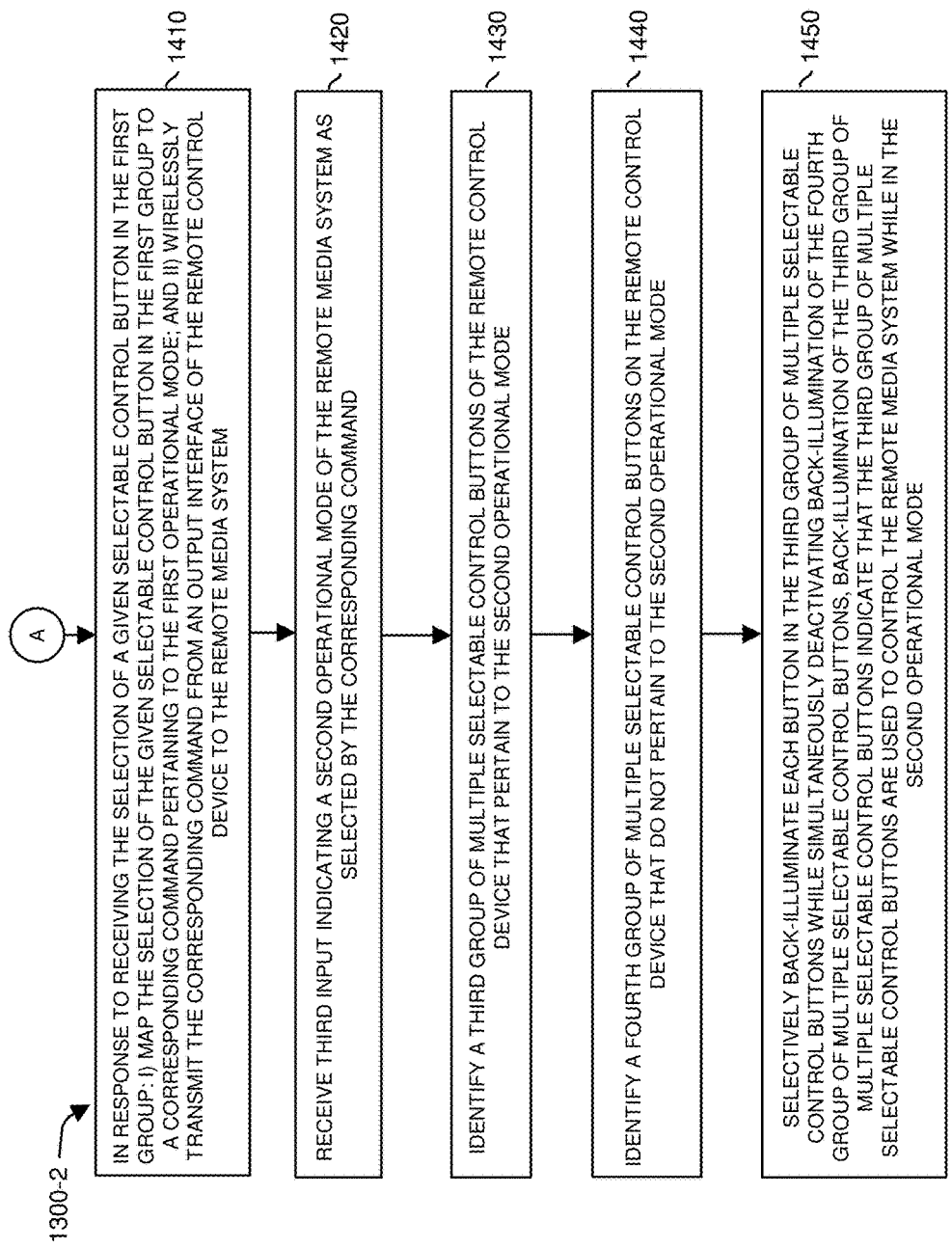

REMOTE CONTROLLER AND SELECTIVE KEY ILLUMINATION

BACKGROUND

Conventional remote control techniques enable a respective user to control a playback device from a distance. For example, a conventional remote controller device typically includes many selectable buttons or keys. In response to pressing of a respective button, control logic in the conventional remote controller device produces a corresponding digital sequence of control information. Via an infrared transducer optical source disposed at an end of the remote controller device, the remote controller device outputs the sequence of control information on an infrared carrier signal to a target device. Typically, the target device being controlled is in the same room as the person operating the remote controller.

The target device receives and decodes data on the infrared carrier signal to reproduce the digital sequence of control data. The target device then executes a respective command represented by the received control data. Accordingly, via pressing of one or more buttons on a remote controller device, a user is able to remotely control a target device.

The conventional technique of remotely controlling a device can be used in any number of different applications in a home network environment. For example, the remote controller device can be used to control a DVD player, set-top box, television, stereo, computer, etc.

In accordance with one conventional application, a home network can include a cable set-top box to receive different channels of content in a cable network environment. Via selection of one or more buttons and respective transmission of one more commands from the remote controller device, a subscriber of cable services is able to remotely control the set-top box and play back desired content on a display screen.

BRIEF DESCRIPTION OF EMBODIMENTS

Conventional button-based techniques for remotely controlling one or more playback devices suffer from a number of deficiencies. For example, most conventional handheld remote controller devices are limited to activating a single backlight that simultaneously illuminates all of the corresponding buttons disposed its face. The purpose of lighting up all of the buttons is to make it easier for a respective user to see them.

Embodiments herein include the observation that not all buttons on a remote controller device are pertinent to a current operational mode of a target device controlled by the remote controller device. For example, pressing a PLAY button on the remote controller device does not perform any useful function when content is currently being played back on a respective display screen. Thus, according to conventional techniques, a respective user is assumed, and required, to understand which of the lighted buttons are applicable to the current operational mode.

Embodiments herein deviate with respect to conventional techniques. For example, one embodiment herein is directed to a novel manner of providing a unique remote controller device facilitating remote control of a remote media system.

More specifically, according to one embodiment, a remote controller device wirelessly controls a remote media system including one or more resources such as a display screen, a set top box, DVD player, etc. The remote controller device includes multiple selectable control buttons, multiple optical sources to backlight the selectable control buttons, and corresponding controller hardware.

In one embodiment, each of the multiple selectable control buttons includes switch whose on/off states depends upon whether the respective selectable control button is selected (such as pressed, touched, etc.) or not. During operation, the controller hardware individually controls back-illumination of each of the multiple selectable buttons.

For example, controller hardware as described herein selectively activates different groupings of the multiple optical sources depending upon a current operational mode of the remote media system. Thus, rather than back-illuminating all of the buttons, including those selectable buttons on the remote controller device that do not pertain to a current operational mode of a target remote media system being controlled, embodiments herein include a remote controller device that back-illuminates only relevant one or more groups of multiple selectable control buttons applicable to the current operational mode. Selective back illumination in this manner provides guidance to a respective user of the remote controller device of which of the multiple selectable buttons can be used at a given instance in time to control the remote media system.

As a further example of embodiments herein, a remote controller device may be a one-way device. For example, a controller in the remote controller device can deduce the current operational state of a target remote media system based on tracking prior selection of one or more buttons on the remote controller device. Alternatively, the remote controller device can be a two-way device configured to receive (wireless) feedback from the remote media system of its current operational state.

In accordance with further embodiments, the remote controller device initially receives first input inputted (such as from the remote media system, a user pressing a button of the remote controller device, etc.) to the remote controller device. The first input indicates a first operational mode (current mode) of the remote media system, which may be an operational mode of displaying content or graphical user interface on a display screen of the remote media system.

In furtherance of providing guidance to the user of the remote controller device, the controller in the remote controller device identifies a first group of multiple selectable control buttons of the remote controller device that pertain to the current (first) operational mode of the remote media system. Additionally, the control hardware identifies a second group of multiple selectable control buttons on the remote controller device that do not pertain to the current (first) operational mode of the remote media system. The controller then selectively back-illuminates the first group of multiple selectable control buttons, while simultaneously deactivating back-illumination of the second group of multiple selectable control buttons.

As previously discussed, backlighting of the first group of selectable buttons in this manner notifies the user of the remote controller device which buttons are pertinent to the current operational mode of the remote media system.

In accordance with further embodiments, the controller can be configured to monitor movement of the remote controller device. Subsequent to selectively back-illuminating the first group of multiple selectable control buttons for an amount of time, and/or detecting lack of movement of the remote controller device, note that the controller can be configured to temporarily deactivate the first group of multiple selectable control buttons to conserve power. Lack of detecting movement of the remote controller device likely means that the remote controller device is not currently being used by the user to control the remote media system. Thus, according to one embodiment, the controller can be configured to deactivate the first group of multiple selectable control buttons OFF in response to detecting that the remote controller device has not been moved for a predetermined amount of time. In response to detecting motion of the remote controller device again, assuming there has been no operational mode change with respect to the remote media system controlled by the remote controller device, the controller selectively back-illuminates the first group of multiple selectable control buttons again while simultaneously deactivating back-illumination of the second group of multiple selectable control buttons. Thus, movement of the remote controller device may mean that a respective user would like to make a selection.

In accordance with further embodiments, if desired, the controller can be configured to back-illuminate one or more groupings of the multiple selectable control buttons using different colored back-lights to indicate to which of multiple different devices in the remote media system each of the multiple selectable control buttons pertains. A first group of buttons backlit with a first color may indicate that the first colored buttons can be used to control a first resource such as a set top box; a second group of buttons backlit with a second color may indicate that the second colored buttons can be used to control a second resource such as a display screen; a third group of buttons backlit with a third color may indicate that the third colored buttons can be used to control a third resource such as a DVD player; and so on.

One or more buttons of the remote controller device may be suitable for controlling multiple different types of devices such as a set top box, DVR (Digital Video Recorder), DVD (digital Video Disc) player, etc. For example, PLAY, FAST FORWARD, and REWIND buttons may be activated at different times to control one of the different types of controlled devices. If desired, the PLAY, FAST FORWARD, and REWIND buttons can be backlit using a first color of light when the current operational mode of remote controller device controls the set top box; the PLAY, FAST FORWARD, and REWIND buttons can be backlit using a second color of light when the current operational mode of the remote controller device controls the DVR; the PLAY, FAST FORWARD, and REWIND buttons can be backlit using a third color of light when the current operational mode of the remote controller device controls the DVD player; and so on. Thus, in such an instance, the color of backlighting provides an indication of the current operational mode of the remote media system and the target device being controlled by the remote controller device.

Various techniques of selective back-illumination advantageously provides notice to the user of the remote controller device of the specific group of buttons (i.e., the first group of funds in this instance) that are applicable to controlling the remote media system while in a particular operational mode. Because certain selectable control buttons are not illuminated, the user of the remote controller device knows not to press such buttons, as such a selection would not perform any useful operation in the current operational mode of the remote media system.

These and other more specific embodiments are disclosed in more detail below.

Any of the resources as discussed herein can include one or more computerized devices, mobile communication devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate remote control of a remote media system. The instructions, when executed by computer processor hardware, cause the computer processor hardware (such as one or more processor devices) to: individually control back-illumination of multiple selectable buttons on a remote controller device; and selectively activate different groupings of the multiple optical sources depending upon a current operational mode of the remote media system, the current operational mode selected via input to the remote controller device.

Yet another embodiments herein includes a computer readable storage medium and/or system having instructions stored thereon to remotely control one or more control functions of a remote media system. The instructions, when executed by a respective computer device (computer processor hardware), cause a processor or multiple processors (computer processor hardware) to: receive first input inputted to the remote controller device, the first input indicating a first operational mode of displaying content on a display screen of the remote media system; identify a first group of multiple selectable control buttons of the remote controller device that pertain to the first operational mode; identify a second group of multiple selectable control buttons on the remote controller device that do not pertain to the first operational mode; and selectively back-illuminate the first group of multiple selectable control buttons while simultaneously deactivating back-illumination of the second group of multiple selectable control buttons.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of controlling a remote media system. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIGS. 13 and 14 combine to illustrate an example method according to embodiments herein.

Figure 1:
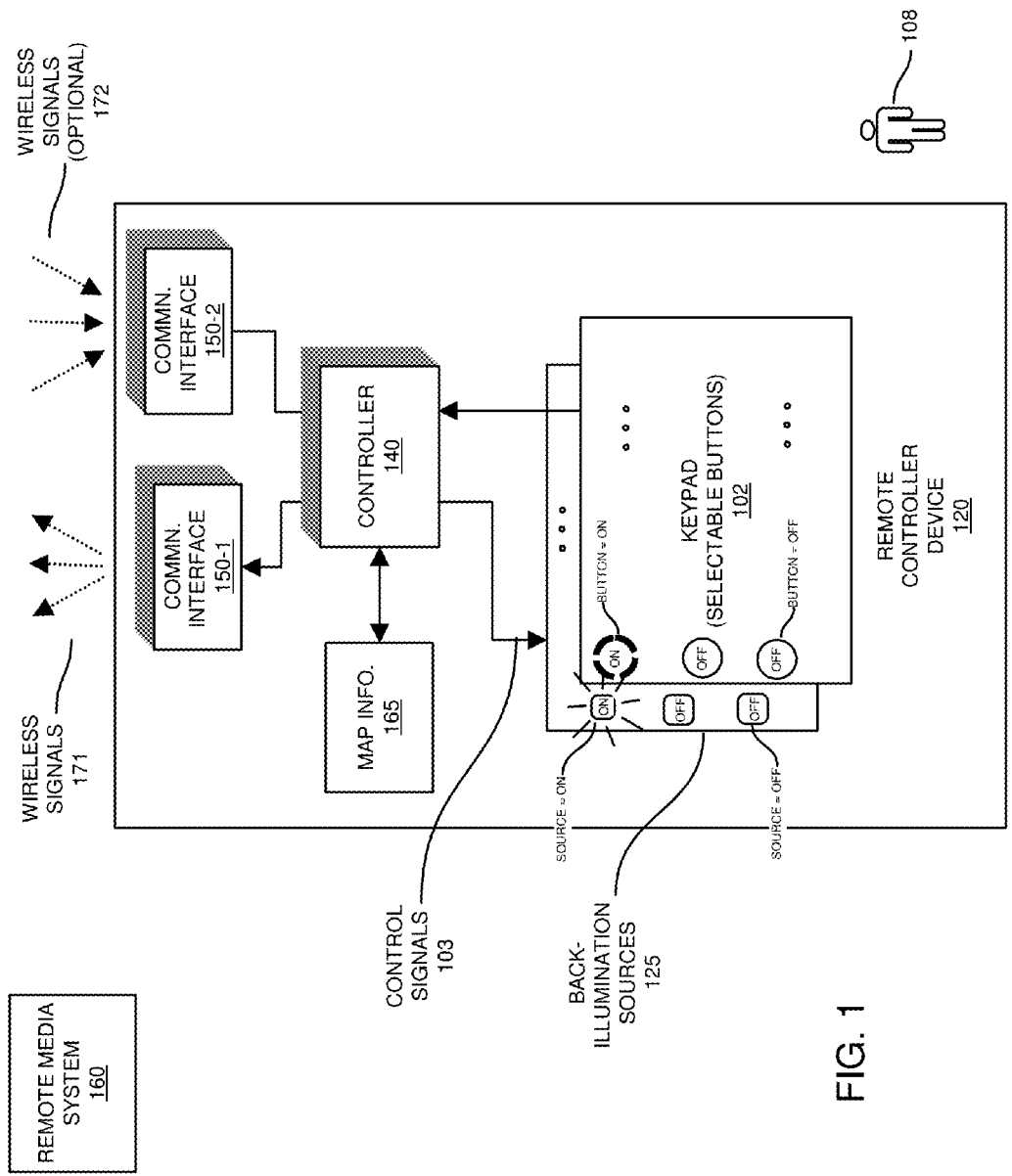
FIG. 1 is an example diagram illustrating a functional block diagram of a remote controller device and corresponding remote media system according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one configuration, a remote controller device wirelessly controls a remote media system. The remote controller device includes multiple selectable control buttons, multiple optical sources, and controller hardware. Each optical source individually back-illuminates one or more respective selectable control buttons of the multiple selectable buttons. The controller hardware selectively activates different groupings of the multiple optical sources depending upon a current operational mode of the remote media system. For example, assume that a respective user of the remote controller device selects a particular button of the remote controller device corresponding to the first operational mode. The remote controller device, in response to receiving this selection, in turn, transmits a wireless signal to the remote media system to control the remote media system to the first operational mode. Rather than illuminate all buttons of the remote controller device, the remote controller device back-illuminates only a relevant group of multiple selectable control buttons applicable to the first operational mode.

Now, more specifically, FIG. 1 is an example diagram illustrating a remote controller device and respective functionality according to embodiments herein.

As shown, according to one embodiment, the remote controller device 120 includes communication interface 150-1 for transmitting wireless signals 171, communication interface 150-2 (optional) for receiving wireless signals 172, controller 140 (hardware, software, and/or firmware), keypad 102, back-illumination sources 125, and map information 165.

Keypad 102 and corresponding keys are disposed on a facing of the remote controller device 120. Each of the keys on keypad 102 is individually backlit by a respective one of the back illumination sources 125. The controller 140 produces control signals 103 indicating which of the multiple back-illumination sources 125 to activate to an ON state to light a respective key at any given time.

Note that the controller 140 can be disposed in any suitable location. In one embodiment, as shown, the controller 140 and corresponding map information 165 are disposed in the remote controller device 120. Alternatively, the controller 140 can be located in the remote media system 160. In the latter instance, the controller communicates wireless signals 172 to the remote controller device 120 to indicate which of multiple keys to illuminate on keypad 102.

As a more specific example, via control signals 103, the controller 140 controls a first back-illumination source of sources 125 back to selectively illuminate a first key of the keypad 102; the controller 140 controls a second back-illumination source of sources 125 to selectively back-illuminate a second key of the keypad 102; the controller 140 controls a third back-illumination source of sources 125 to selectively back-illuminate a third key of the keypad 102; and so on.

By further way of non-limiting example embodiment, if desired, each of the back-illumination sources 125 can be configured to support generation of different colored light at different times. In such an instance, in addition to activating or deactivating a respective source, the controller 140 controls a respective color of light emitted by the source to illuminate a respective key. Accordingly, the keys of keypad 102 can be illuminated using any of multiple different colors.

As more particularly discussed herein, the controller 140 selectively back illuminates groupings of the keys on keypad 102 at any given time to indicate to the user 108 which of the less-than-all portion of keys on keypad 102 are applicable to (selectable in and applicable to) the current operational mode of a remote target (such as remote media system 160) controlled by the remote controller device 120.

As a more specific example of the operation of remote controller device 120, via activation (such as pressing) of one or more backlighted keys on keypad 102, the remote controller device 120 detects different control input from the user 108. In response to detecting selection of the respective one or more back lighted keys by user 108, the controller 140 communicates corresponding one or more selected control commands to the communication interface 150-1. The communication interface 150-1, in turn, converts the command received from the controller 140 into respective one or more wireless signals 171 transmitted to a corresponding target resource controlled by the remote controller device 120.

In this example embodiment, the remote media system 160 receives the wireless signals 171 and executes the received one or more commands. In this manner, via selection of one or more keys on keypad 102, the respective user 108 is able to operate the remote controller device 120 and control the operational mode of a target remote media system 160.

In accordance with further embodiments as shown, the remote controller device 120 optionally includes communication interface 150-2 to receive wireless signals 172 from the remote management system 160 or other suitable resource. In one embodiment, the remote media system 160 generates the wireless signals 172 as feedback indicating the current operational mode of the remote media system 160. Thus, via wireless signals 172, the remote media system 160 apprises the controller 140 of the current operational mode of remote media system 160.

As further discussed herein, in response to receiving notification of the current operational mode, the controller 140 accesses and utilizes map information 165 to identify which (first) grouping of one or more of the multiple keys on keypad 102 are applicable to the current operational mode of the remote media system 160. In accordance with further embodiments, the controller 140 also can use map information 165 to identify a (second) grouping of one or more of the multiple keys on keypad 102 that are not applicable to the current operational mode.

In accordance with the current operational mode, the controller 140 initiates backlighting of a respective (first) grouping of one or more keys on the keypad 102 to provide notification to the user 108 of which keys on keypad 102 are applicable to further control the remote media system 160 in the current operational mode. The controller 140 prevents backlighting of the second grouping of one or more keys on the keypad 102 to provide notification to the user 108 that such keys are not applicable to further control in the current operational mode.

In accordance with further embodiments, each of the buttons or keys on keypad 102 is at least partially or completely translucent so that light from a back-illumination source passes through to the eye of the user 108. The portion of a respective button including text (such as text INFO, DVR, etc.) or symbol (up arrow, down arrow, etc.) completely or partially blocks light from being passed to the eye of the user 108. Accordingly, when back-lighted, the user 108 is able to identify the purpose of the respective button, as well as that such a button is lit. In certain instances, front light from an overhead light may illuminate the keys such that the user 108 is able to discriminate one button from another without the buttons being backlit.

As previously discussed, conventional techniques include simultaneously backlighting all buttons on a respective remote controller device regardless of whether selection of a currently backlighted button will perform a useful function. In contrast to the conventional techniques, via selective backlighting of the respective keys on keypad 102, embodiments herein provide guidance as to which of the buttons (keys) on a respective keypad 102 can be selected to further control the remote media system 160 in the current operational mode.

Figure 2:
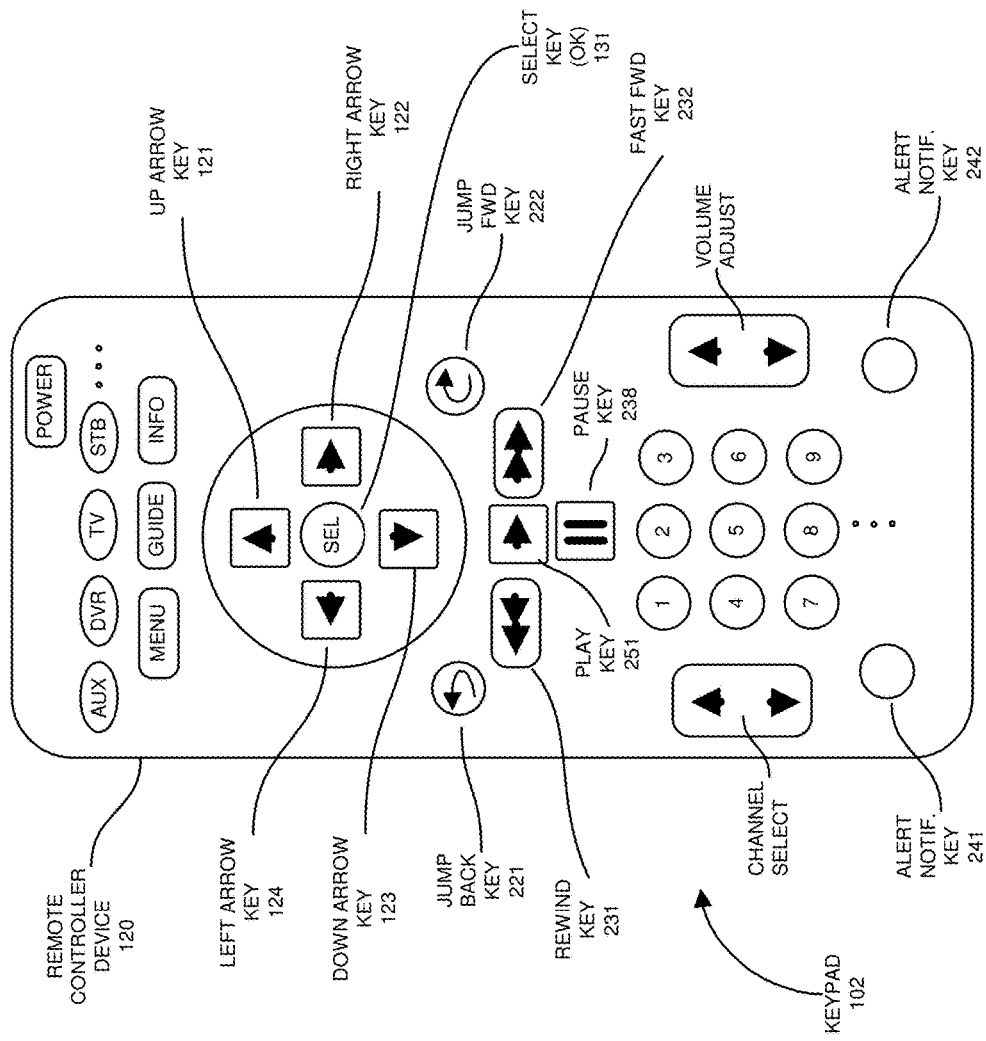
FIG. 2 is an example diagram of a remote controller device according to embodiments herein.

FIG. 2 is an example diagram illustrating selectable keys (buttons) on a remote controller device according to embodiments herein.

As shown, the remote controller device 120 can include any number of selectable (pressable, touchable, etc.) keys to control any of one or more target devices associated with a remote media system 160.

For example, in this non-limiting embodiment, keypad 102 of the remote controller device 120 includes a power button to control power of the remote media system 160; keypad 102 includes a DVR button to control or select use of a DVR hardware associated with remote media system 160; keypad 102 includes a TV button to control or select use of a television (display screen) hardware associated with remote media system 160; keypad 102 includes a STB button control or select use of a set top box hardware of the remote media system 160; etc.

As further shown, the keypad 102 can be configured to include a MENU button to select display of a menu (graphical user interface) on a display screen of the remote media system 160 to the user 108; keypad 102 includes GUIDE button to select display of program guide (graphical user interface) on a display screen of the remote media system 160 to the user 108; keypad 102 includes INFO button to select display of attribute information (title, channel, duration, host names, etc.) associated with current content on a display screen of the remote media system 160 to the user 108; etc.

Additionally, as shown, the remote controller device 120 includes left arrow key 124, right arrow key 122, up arrow key 121, and down arrow key 123 enabling a respective user 108 to navigate about a respective graphical user interface displayed on a display screen of the remote media system 160. The selection key 131 enables the respective user 108 to select an item or, more generally, make a selection decision associated with the graphical user interface.

Remote controller device 120 further includes multiple keys to control playback of content on a respective display screen of the remote media system 160. For example, the keypad 102 of the remote controller device 120 includes jump back key 221 to move a current playback pointer of playing content to an earlier location by a predetermined amount of time in a currently playing video stream; the keypad 102 of the remote controller device 120 includes a jump forward key 222 to move a current playback pointer of playing back content ahead by a predetermined amount of time in the currently playing video stream; the keypad 102 of the remote controller device 120 includes a fast forward key 232 to skip a current playback pointer of playing back content ahead in the video stream; the keypad 102 of the remote controller device 120 includes a rewind key 231 to move a current playback pointer of playing back content behind in the video stream; the keypad 102 of the remote controller device 120 includes a pause key 238 to pause playback of the currently playing video stream; the keypad 102 of the remote controller device 120 includes a play key 251 to resume playback of a paused video stream when pressed; etc.

The keypad 102 of the remote controller device 120 further includes one or more channel select buttons to select the next or previous channel depending on which end of the channel button is selected; the keypad 102 of the remote controller device 120 further includes a volume adjust button to selectively increase or decrease volume depending on which end of the volume button is selected; the keypad 102 includes individual numbered buttons to select corresponding numbers; etc.

As yet further shown, the remote controller device 120 can be configured to include one or more alert notification keys 241, 242, etc. In one embodiment, the controller 140 selectively back-illuminates the alert notification keys 241, 242, etc., at different times to provide event notifications to the user 108.

For example, assume at a prior time that the user 108 programs the remote media system 160 to record specific content selected by the user 108. Via communications conveyed via wireless signals 172, subsequent to completing the requested recording, the remote media system 160 communicates completion of the task (recording of selected content) to the communication interface 150-2. Communication interface 150-2 forwards the notification of the completed task and availability of recorded content to controller 140. In response to receiving the communication indicating completion of the task (such as recording of selected content by the user 108), the controller 140 initiates a notification such as back-illumination, flashing, etc., of the alert notification key 241 to user 108.

In this manner, the user 108 can be alerted of different events via illumination of keys 241, 242, etc., which correspond to different types of events.

Note that alert notifications are not limited to lighting of respective one or more keys on keypad 102. Notifications can further include producing one or more different types of audible signals from the remote controller device 120 to notify the user 108 of respective trigger events.

Yet further embodiments herein include receiving input from the user 108 selecting (pressing) the alert notification key 241 after it has been back-lighted. For example, in response to receiving the selection of the alert notification key 241, such as when backlit, the controller 140 initiates transmission of a respective command associated with the alert key 241 over wireless signals 171 to the remote media system 160. In one embodiment, selection of the alert key 241 causes the remote communication device 120 to notify the remote media system 160 to perform an appropriate function such as play back the now available recorded content.

Figure 3:
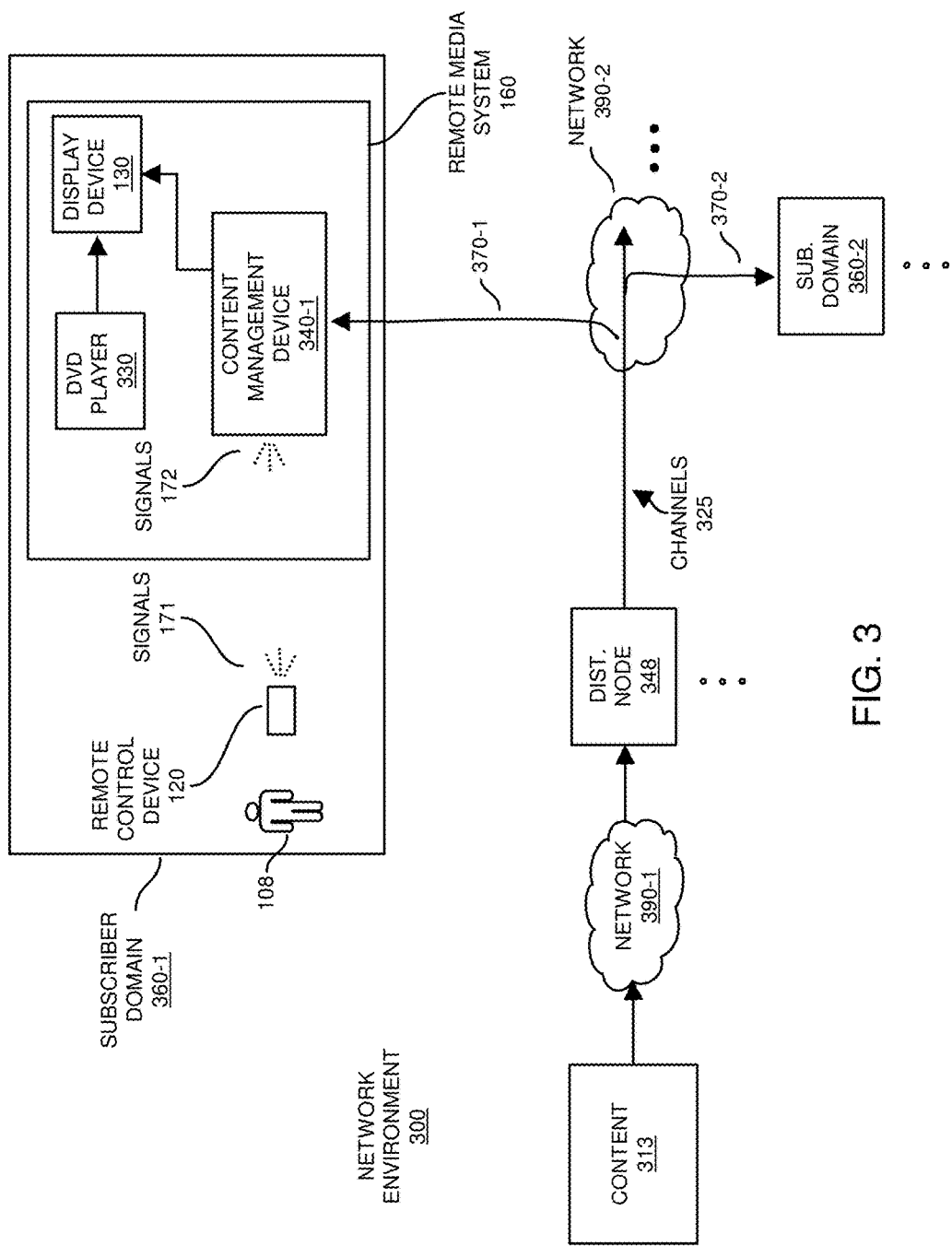
FIG. 3 is an example diagram illustrating a network environment in which a user operates a remote controller device to control a remote media system according to embodiments herein.

FIG. 3 is an example diagram illustrating a network environment in which a user operates a remote controller device to control operation of a remote media system according to embodiments herein.

More specifically, by way of a non-limiting example, network environment 300 can be a shared cable network in which content 313 is delivered over multiple channels 325 of a respective shared communication link 370 (communication link 370-1, communication link 370-2, etc.) to one or more subscriber domains 360 (e.g., subscriber domain 360-1, subscriber domain 360-2, etc.).

Each of the subscriber domains 360 can include one or more content management devices (e.g., set-top box, personal computer, iPad™, etc.) that selectively tunes to one or more of the multiple channels 325 to store and/or play back respective content 313. Note that the content management device 340-1 can be configured to locally store content (in a respective DVR therein) as specified by the user 108. In a manner as previously discussed, the user 108 can select playback of the recorded content via input to the remote controller device 120.

Further in this non-limiting example, the distribution node 348 receives multiple channels 325 of content 313 as transmitted over network 390-1. The received content 313 can be encoded in accordance with one or more different streaming protocols. As its name suggests, the distribution node 348 transmits the multiple channels 325 of content 313 over the shared communication link 370 (e.g., a coaxial cable, fiber, etc.). As shown, terminal ends of shared communication link 370 branch off into each subscriber domain 360 via communication link 370-1, communication link 370-2, etc.

In one embodiment, shared communication link 370 conveys channels 325. By way of a non-limiting example, the communication channels 325 can be or include web-based channels established in accordance with the DOCSIS (Data Over Cable Service Interface Specification) standard; QAM channels; linear broadcasted content; etc.

Thus, in one embodiment, as previously discussed, the shared communication link 370 represents shared communication media. The combination of subscriber domains 360 and corresponding subscribers therein having access to shared communication link 370 can represent a service group. In other words, an aggregate of the subscriber domains 360 in network environment 300 can represent a service group of subscribers having access to a common set of encoded signals, although the different subscribers may have different access privileges with respect to decoding of the available channels 325 depending on respective subscriptions and corresponding paid fees.

In accordance with further embodiments, note that the network 390-2 and corresponding communication links can include any suitable media such as wireless links, fibers, coaxial cable, twisted pair wire, etc.

In this non-limiting example embodiment, the subscriber domain 360-1 includes user 108 (e.g., a cable network subscriber), remote controller device 120, a content management device 340-1 (e.g., set-top box, personal computer, iPad™, etc.), and one or more display devices including display device 130 (i.e., playback device).

The content management device 340-1 is coupled to shared communication link 370-1 to receive channels 325 of content 313. The content 313 can be any suitable type of media (e.g., audio, video, streaming data, linear television programs, video on demand, IP television, etc.).

Via input from the user 108, the content management device 340-1 can be selectively tuned amongst the multiple available channels 325 to record or play back selected streaming content on display device 130 (which is part of the remote media system 160 in subscriber domain 360-1).

Note that the content management device 340-1 may be one of multiple content management devices located in the subscriber domain 360-1. Display device 130 may be one of multiple display devices in the subscriber domain 360-1. Each of subscriber domains 360 can be configured in a similar manner.

As previously discussed in FIG. 1, the remote controller device 120 can include a back illuminated keypad 102. Selection of illuminated keys on the remote controller device 120 indicates how to control settings of the remote media system 160 and corresponding resources such as content management device 340-1, DVD player 330; display screen 130, etc. For example, as previously discussed, selection of a respective keypad on the remote controller device 120 causes the remote controller device 120 to transmit a respective control signal (as wireless signal 171) over a wireless communications link to the remote media system 160.

Figure 4:
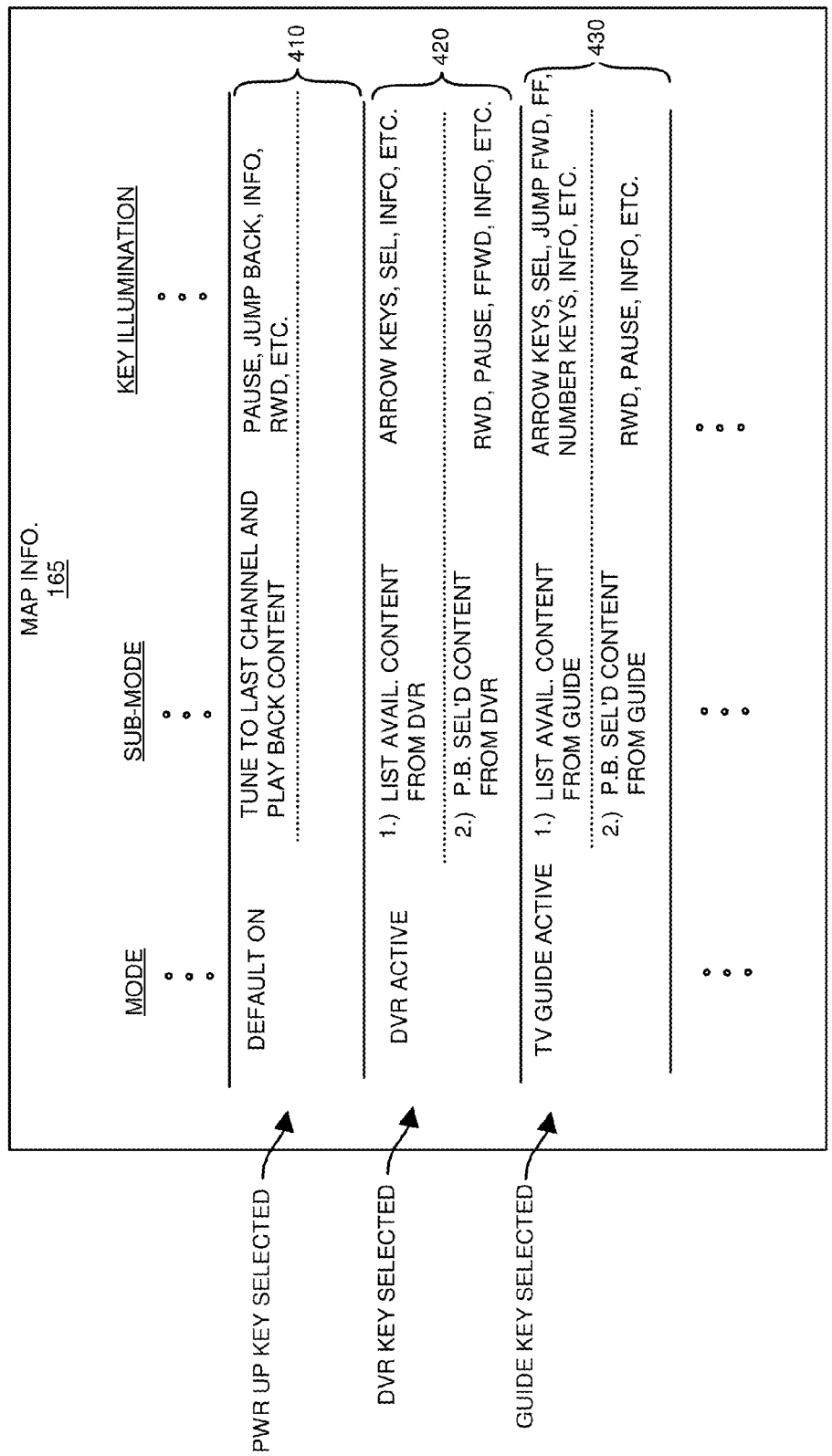
FIG. 4 is an example diagram illustrating map information supporting selective illumination of keys on a remote controller device according to embodiments herein.

FIG. 4 is an example diagram illustrating map information supporting selective illumination of keys on a remote controller device according to embodiments herein.

As previously discussed, the controller 140 determines which of the multiple keys associated with keypad 102 to backlight for the corresponding user 108. In one embodiment, the controller 140 receives input from the communication interface 150-2 indicating the current operational mode of the remote media system 160.

Note that further or alternative embodiments herein can include relying on input (such as prior key selection on keypad 102) to the remote controller device 120 from user 108 to determine the current operational mode of the remote media system 160. Thus, embodiments herein can include use of a one-way communication (communications only from the remote controller device 120 to the remote media system 160) remote controller device 120 that is unequipped to receive operational state mode information from the remote media system 160.

As shown, map information 165 indicates which of multiple keys on keypad 102 to illuminate depending upon a current operational mode (as deduced or explicitly indicated in feedback) of the remote media system 160. For example, according to entry 410 in map information 165, if the current state of the remote media system 160 is to tune to last channel to playback content, the controller 140 is informed to illuminate the pause key 238, the jump back key 221, the information key, the rewind key 231, etc., on keypad 102.

Additionally, according to entry 420 in map information 165, if the current state of the remote media system 160 is initial activation/control of a DVR device in remote media system 160 (with a graphical user interface on the display screen 130), the controller 140 is informed to illuminate the arrow keys 121, 122, 123, and 124 as well as select key 131, etc. The illuminated keys are selectable by the user 108 to make a selection of content with respect to a list of available content in a graphical user interface displayed on display screen 130.

If the current state of the remote media system 160 is playback of content (such as a video stream) from the DVR, the controller 140 is informed to illuminate relevant keys (buttons) including the pause key 238, the jump back key 221, the information key, the rewind key 231, etc., such that the user 108 is able to control playback of the currently streaming video content played back on display screen 130.

Additionally, according to entry 430 in map information 165, if the current state of the remote media system 160 is initial activation/control of a program guide (such as a graphical user interface indicating timeslots and channel information) of when different content is broadcasted and available, the controller 140 is informed to illuminate the arrow keys 121, 122, 123, and 124 as well as select key 131, etc. Such illuminated keys are selectable by the user 108 to make a selection of content with respect to a list of available content in a graphical user interface displayed on display screen 130 in the program guide.

If the current state of the remote media system 160 is playback of content as previously selected from the content guide, the controller 140 is informed to illuminate the pause key 238, the jump back key 221, the information key, the rewind key 231, etc., such that the user 108 is able to control playback of the currently streaming video content on display screen 130.

Figure 5:
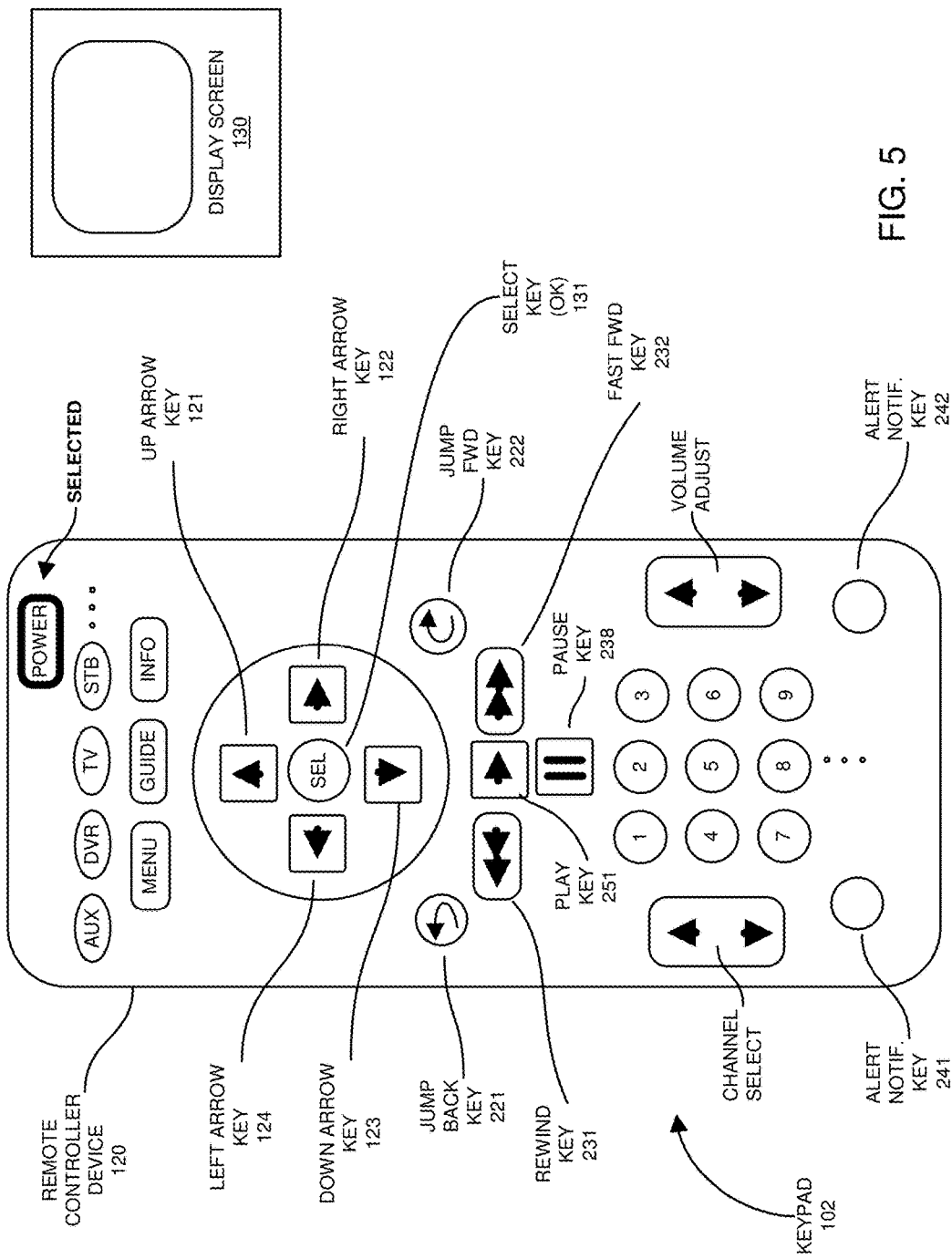
FIG. 5 is an example diagram illustrating selective illumination of keys on a remote controller device according to embodiments herein.

FIG. 5 is an example diagram illustrating selective illumination of keys on a remote controller device according to embodiments herein.

Assume, as an initial condition, that the display screen 130 in the remote media system 160 is powered to an OFF state. In one embodiment, because the remote media system 160 is in the OFF state, the remote controller device 120 back illuminates only the POWER button of the keypad 102 as shown because the other buttons will not yet perform any function at this point. In one embodiment, the control 140 illuminates the POWER button in response to detecting motion of the remote controller device 120; the detected movement indicating that the remote controller device 120 is about to be used by the user 108.

To activate the remote media system 160 to an ON state, or device therein, the user 108 points the remote controller device 120 to the remote media system 160 and selects (such as presses) the POWER button on the remote controller device 120 to turn ON (i.e., power) the display device 130 (such as a television) and/or other one or more devices such as content management device 340-1, DVD player 330, etc., of the remote media system 160.

In response to receiving selection of the POWER button, the controller 140 controls the communication interface 150-1 to transmit wireless signals 171 indicating to power the display device 130 and/or other devices such as content management device 340-1, DVD player 330, etc.

Figure 6:
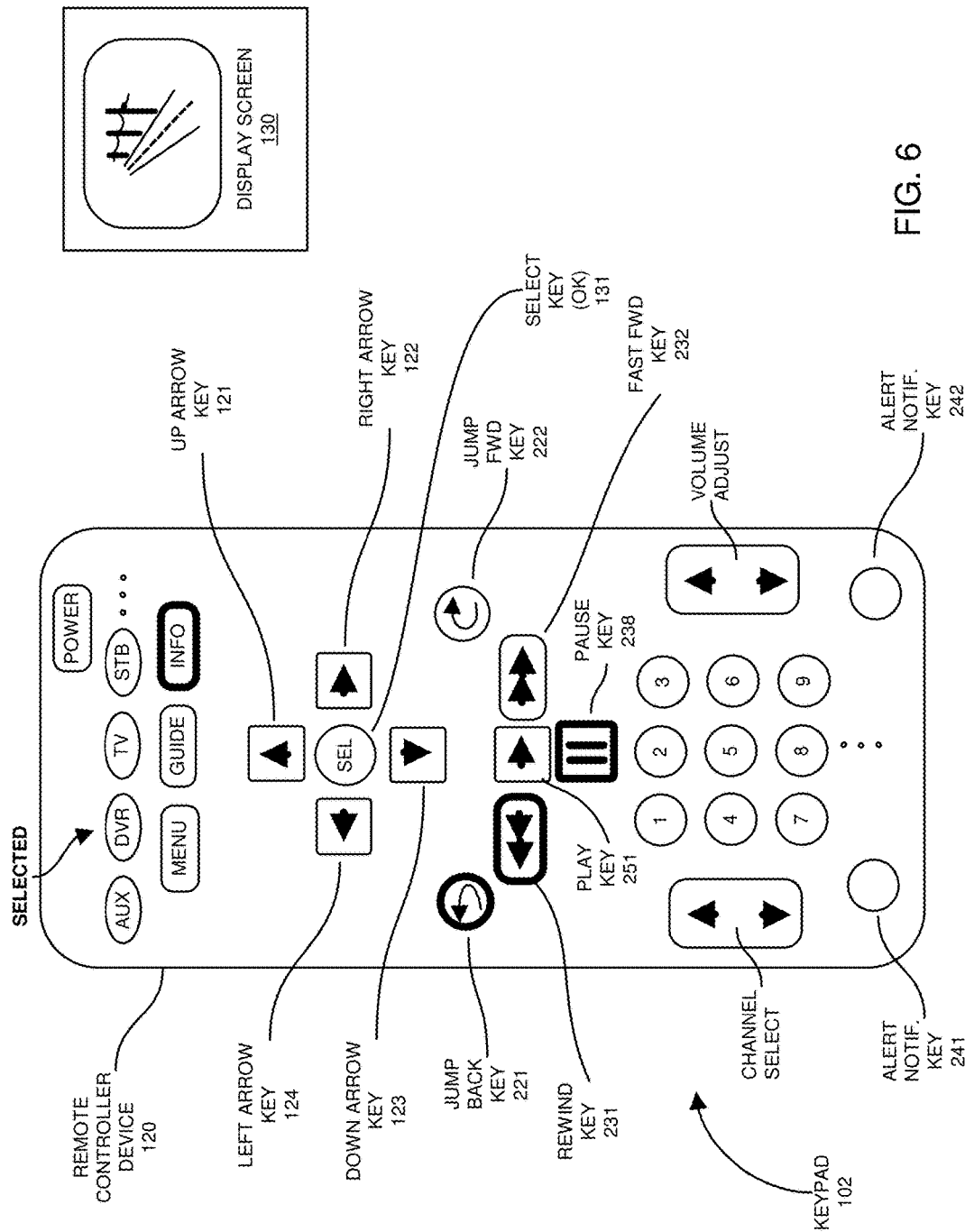
FIG. 6 is an example diagram illustrating selective illumination of keys on a remote controller device and use of the illuminated keys on the remote controller device to control a remote media system according to embodiments herein.

In response to receiving the power on command, assume in this example embodiment that the content management device 340-1 or remote media system 160 tunes to a last selected channel (during a previous power up) and plays back corresponding broadcasted content on the selected channel on display screen 130 as shown in FIG. 6.

FIG. 6 is an example diagram illustrating selective illumination of keys on a remote controller device and use of the illuminated keys on the remote controller device to control a remote media system according to embodiments herein.

In a manner as previously discussed, the controller 140 receives feedback from the remote media system 160 (or any suitable resource) indicating the current operational mode of the remote media system 160 after selection of the POWER button. In one embodiment, as previously discussed, the feedback can be notification of the user 108 selecting a mode button on the remote controller device 120.

In this example, because the operational state of the remote media system 160 is playback of content on a last tuned channel, the controller 140 uses map information 165 to identify which of the multiple keys to illuminate on the keypad 102.

As indicated by the map information 165, and corresponding entry 410, using a first color of backlight (such as green), the controller 140 backlights jump back key 221, rewind key 231, pause key 238, INFO key, etc., to indicate the relevant buttons to control playback of content. As previously discussed, backlighting of these keys on keypad 102 provides the user 108 guidance as to which of the multiple keys on the keypad 102 are applicable to current playback of the content on the display screen 130.

According to yet further embodiments, note that the controller 140 can be configured to initiate backlighting of another grouping of keys (such as AUX, DVR, TV, STB, . . . ) using a second color of light (such as red). Back illumination using the second color indicates that the user 108 is able to select these keys to switch a setting of the remote media system 160 to a different operational mode than the current operational mode of playing back content.

Assume further in this example that the user 108 wishes to use DVR functionality associated with the remote media system 160 instead of watching current playback of content on display screen 130. In such an instance, the user 108 selects the DVR button (which may or may not be lighted) on the keypad 102. In response to receiving the selection, the controller 140 generates wireless signals 171 to notify the remote media system 160 to switch to the DVR operational mode as shown in FIG. 7.

Figure 7:
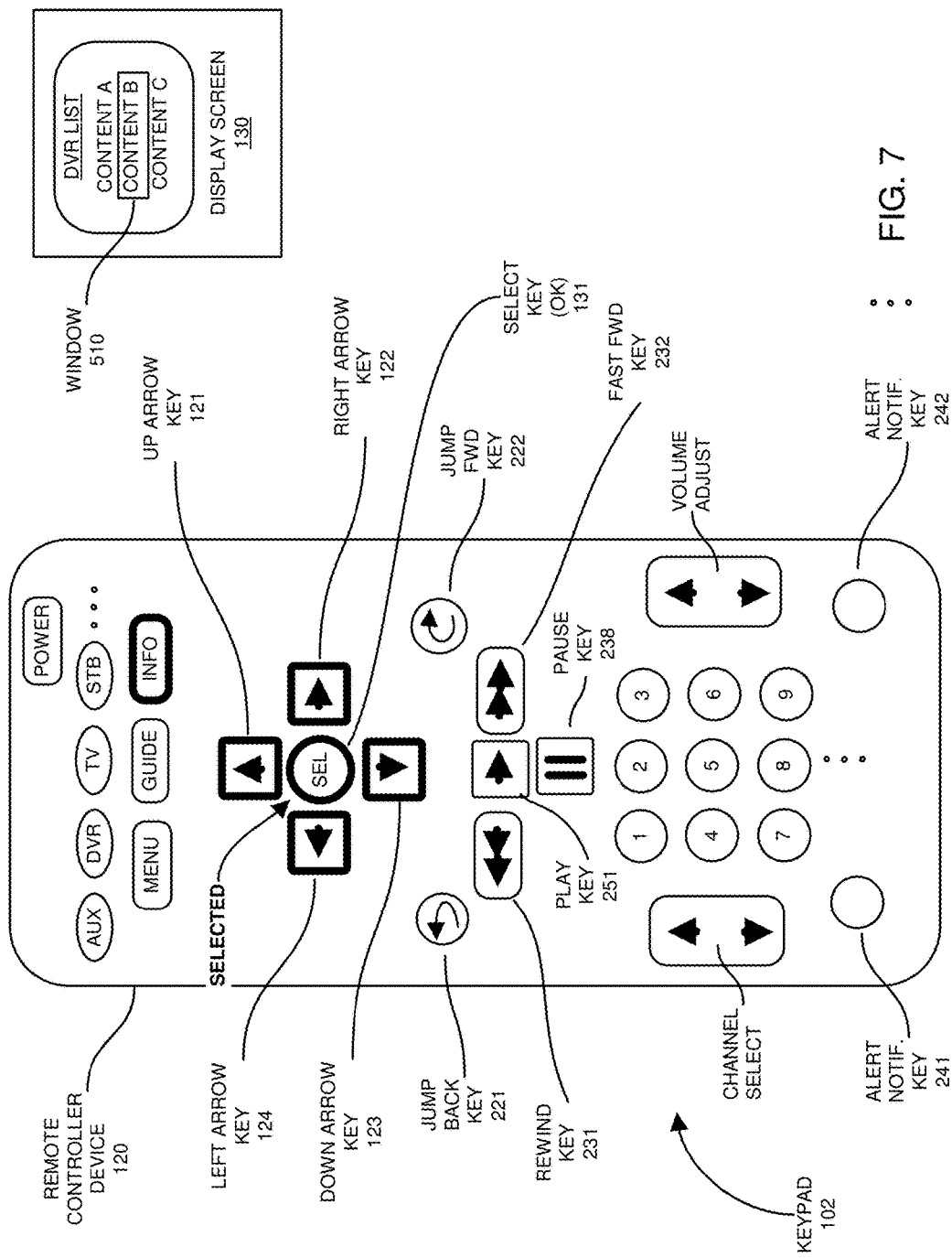
FIG. 7 is an example diagram illustrating selective illumination of keys on a remote controller device and use of the illuminated keys on the remote controller device to control a remote media system according to embodiments herein.

FIG. 7 is an example diagram illustrating selective illumination of keys on a remote controller device and use of the illuminated keys on the remote controller device to control a remote media system according to embodiments herein.

Selection of the DVR mode (and corresponding DVR button as previously discussed in FIG. 6) causes the remote management system 160 to initiate display of a graphical user interface on display screen 130. In this example embodiment, the graphical user interface includes display of the DVR list of available recorded content. In this instance, the DVR list displayed in the graphical user interface on display screen 130 includes display of selectable content A, content B, and content C, etc.

In a similar manner as previously discussed, the controller 140 receives feedback or input indicating that the remote management system 160 is set to an operational mode in which the display screen 130 displays a DVR list of available content A, B, C, etc., on display screen 130. The controller 140 maps the identified current operational mode to entry 420 in the map information 165 to determine which of the multiple keys of keypad 102 to illuminate.

In this instance, the map information 165 indicates to back illuminate (using a common color such as green) the grouping of multiple keys including the arrow keys 121, 122, 123, and 124 as well as select key 131, etc. Selection of these different illuminated keys enables the user 108 to control the graphical user interface displayed on the display screen 130.

In accordance with further embodiments, if desired, during an operation of selectively back-illuminating a group of multiple selectable control buttons as indicated by the map information 165, and while simultaneously deactivating back-illumination of a (second) group of irrelevant control buttons, the controller 140 can be configured to: back-illuminate the first group of multiple selectable control buttons using a first color of light to indicate that the first group of multiple selectable control buttons are selectable to control the first operational mode of controlling the remote media system. Additionally, the controller 140 can be configured to back-illuminate one or more other buttons such as the DVR control button using a second color of light to indicate that the DVR button was the last button selected by the user of the remote controller device 120 to select the current DVR operational mode in which the remote media system 160 is currently set. Illuminating the last button used to set the current operational mode of the remote media system 160 with a unique color or visual indication provides an indication to the user 108 of which of the buttons on the keypad 102 was selected to control the remote media system 160 to the current operational mode. If needed, the user can press the last selected button again if there was no mode change on the last selection.

Thus, according to embodiments herein, as previously discussed, while selectively back-illuminating the first group of multiple selectable control buttons using green light and simultaneously deactivating back-illumination of a second group of irrelevant buttons (such as the rewind key 231, fast forward key 232, etc.), the controller 140 can be configured to provide a visual indication indicating which particular selectable control button (such as the DVR button) of the multiple selectable control buttons that was selected by a user of the remote controller device to select the current operational mode (DVR mode) of the remote media system 160 to the DVR mode. The visual indication (such as red lighted or flashing DVR button) distinguishes the DVR button from the first group of green-backlit selectable control buttons including the arrow keys 121, 122, 123, and 124 as well as select key 131, etc.

Accordingly, embodiments herein include: while selectively back-illuminating a first group of multiple (pertinent) control buttons and simultaneously deactivating back-illumination of a second group of multiple (non-pertinent) control buttons, providing a visual indication (such as a different color of light) indicating which particular selectable control button (such as the DVR button) of the multiple selectable control buttons was selected by a user of the remote controller device to select the first operational mode, the visual indication distinguishing the particular selectable control button (DVR button) from the first group of multiple selectable control buttons and the second group of multiple selectable control buttons.

Further, in this example embodiment, the green-illuminated keys are selectable by the user 108 to make a selection of content with respect to a list of available content displayed in a graphical user interface on display screen 130. The user 108 uses the illuminated arrow keys to move the selection window 510 about the graphical user interface displayed on the display screen 130. After moving the window 510 to capture the appropriate content, assume that the user 108 presses the select key 131 to select playback of content B. In such an instance, the controller 140 causes generation of wireless signals 171 from the communication interface 150-1 to the remote media system 160 indicating the selection. In response to receiving the command from the remote controller device 120, the DVR associated with the remote media system 160 initiates playback of selected content B on the display screen 130 as shown in FIG. 8.

Figure 8:
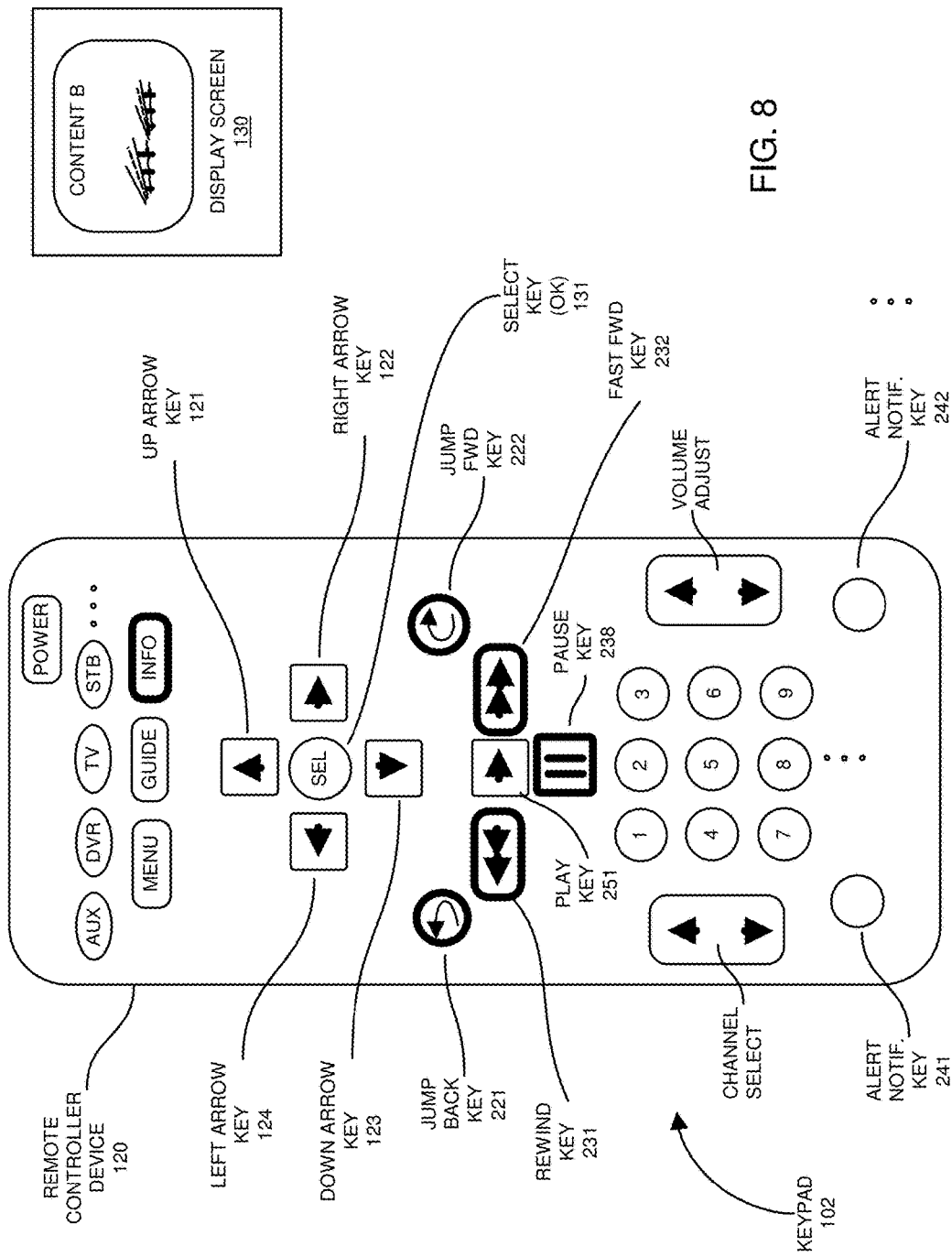
FIG. 8 is an example diagram illustrating selective illumination of keys on a remote controller device and use of the illuminated keys on the remote controller device to control a remote media system according to embodiments herein.

FIG. 8 is an example diagram illustrating selective illumination of keys on a remote controller device and use of the illuminated keys on the remote controller device to control a remote media system according to embodiments herein.

As previously discussed, selection of the select key 131 while in the DVR listing mode causes the remote management system 160 to initiate playback of selected video content B on display screen 130.

In a manner as previously discussed, the controller 140 receives feedback or input indicating that the remote management system 160 is set to an operational mode in which the display screen 130 plays back selected content B on display screen 130. The controller 140 maps the current operational mode (playback of content B from the DVR to display screen 130) to entry 420 in the map information 165 to determine which of the multiple keys of keypad 102 to illuminate at this point. In this instance of playing back selected content from the DVR, the map information 165 indicates to back illuminate (using a common color such as green) the grouping of relevant control keys including the jump back key 221, the information key, the rewind key 231, the pause key 238, the fast-forward key 232, the jump forward key 222, etc.

Via selection of these illuminated keys (such as green-illuminated keys), the user 108 is able to control playback of the content B on display screen 130.

Figure 9:
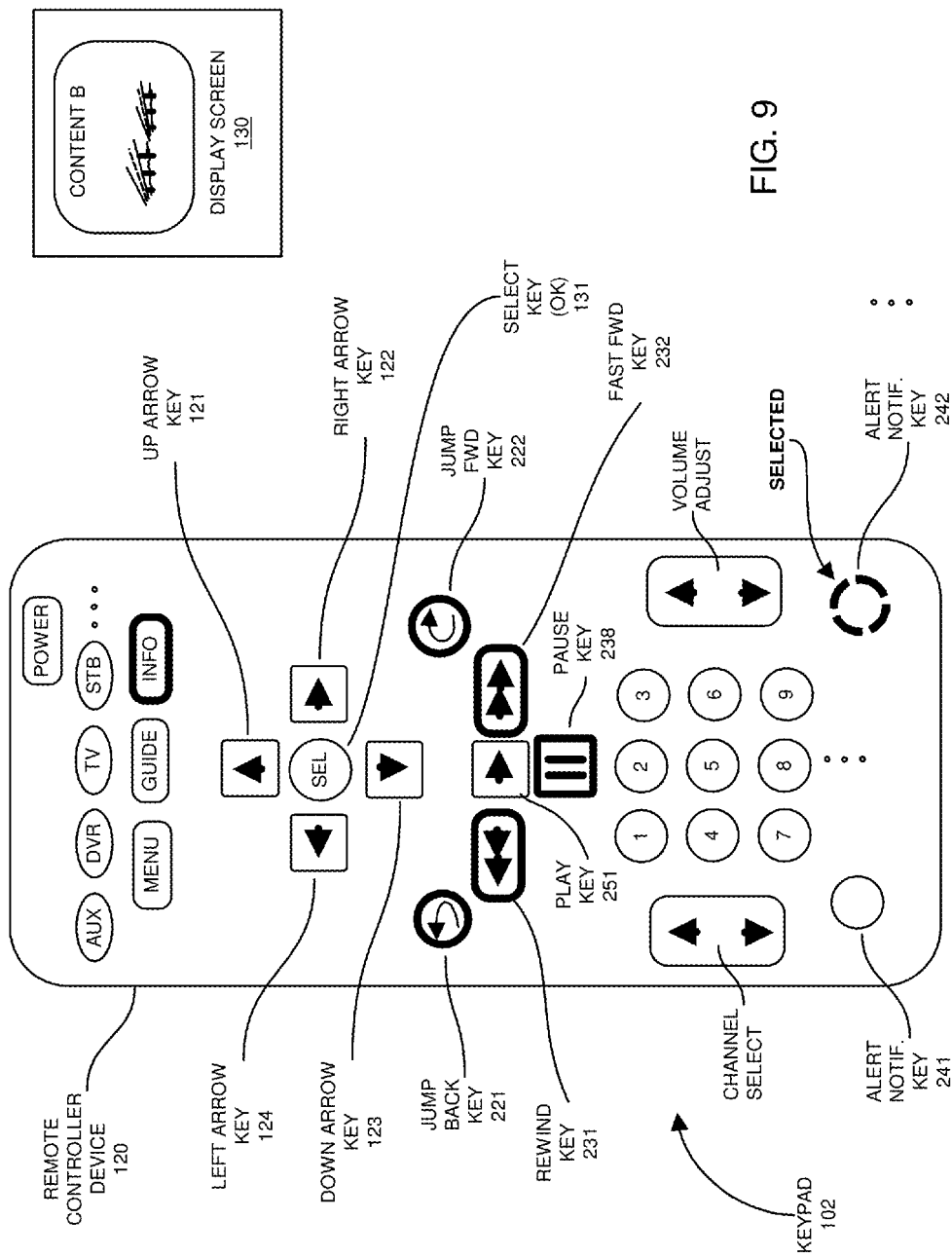
FIG. 9 is an example diagram illustrating selective illumination of keys on a remote controller device and use of the illuminated keys on the remote controller device to control a remote media system according to embodiments herein.

FIG. 9 is an example diagram illustrating selective illumination of keys on a remote controller device and use of the illuminated keys on the remote controller device to control a remote media system according to embodiments herein.

While playing back the content B on display screen 130, assume that the controller 140 receives a notification from the remote media system 160 of a trigger event such as completion of a background task, such as that the user's favorite television show (content G) is currently being broadcasted over a respective channel, etc. In such an instance, to notify the user 108 of the detected event as detected by the remote media system 160, the controller 140 back illuminates the alert notification key 242.

In one embodiment, the controller 140 back illuminates the alert notification key 242 using a different color of light such as yellow. If further desired, the controller 140 can be configured to additionally or alternatively flash or blink the yellow back-lighting of the alert notification key 242 between ON and OFF states every half second to enhance the notification to the user that the event has occurred.

In furtherance of this example embodiment, assume that the user 108 presses the alert notification key 242 to view details associated with the alert. In such an instance, the controller 140 transmits to the remote media system 160 indicating that the user 108 desires to view the details associated with the alert notification key 242. This is more particularly shown in FIG. 10.

Figure 10:
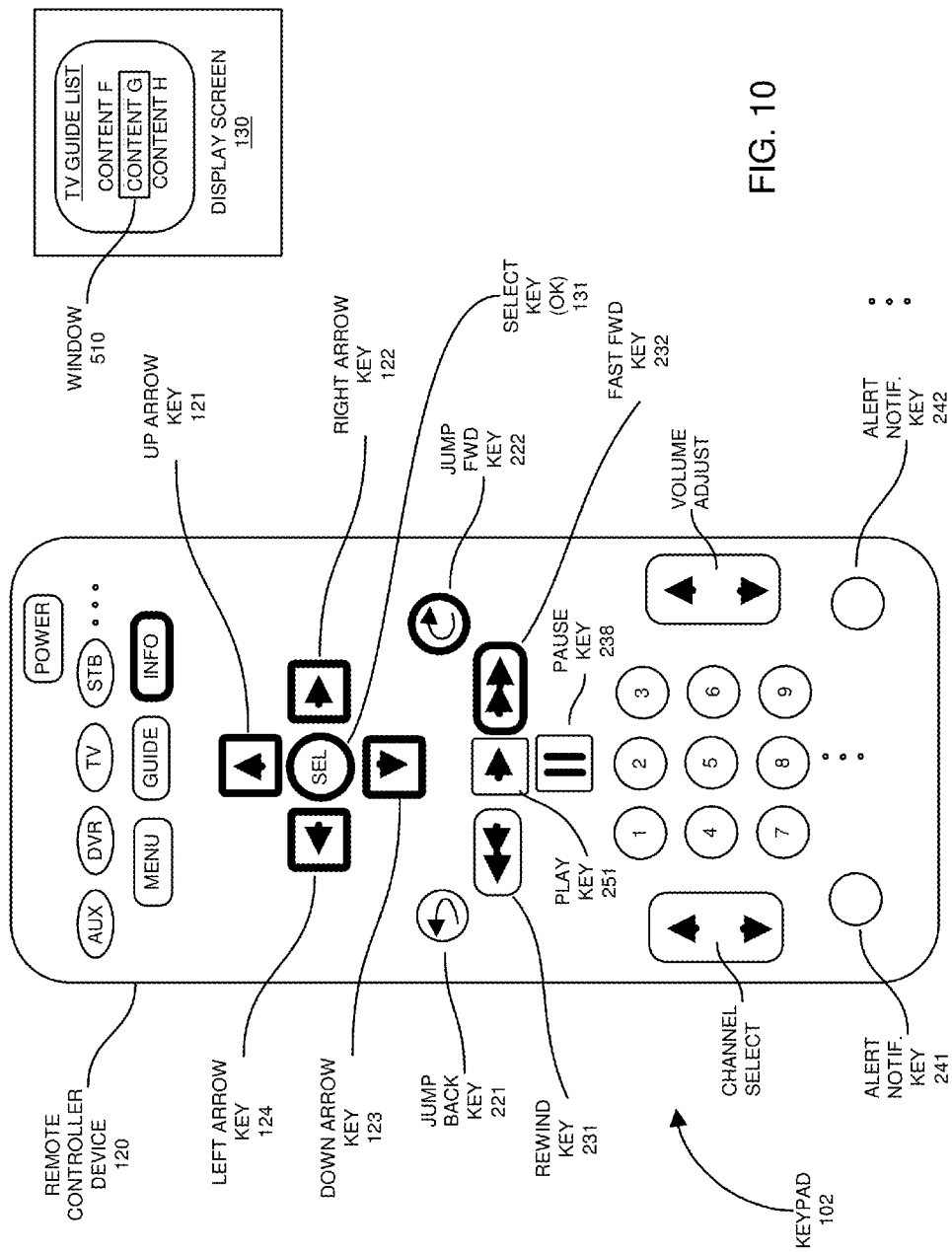
FIG. 10 is an example diagram illustrating selective illumination of keys on a remote controller device and use of the illuminated keys on the remote controller device to control a remote media system according to embodiments herein.

FIG. 10 is an example diagram illustrating selective illumination of keys on a remote controller device and use of the illuminated keys on the remote controller device to control a remote media system according to embodiments herein.

Selection of the alert notification key 242 as previously discussed causes the remote management system 160 to initiate display of a respective graphical user interface on display screen 130 associated with the alert. In this example embodiment, the graphical user interface includes display of a title of content G associated with the trigger event causing lighting of the alert notification key 242. In this instance, the list displayed in the graphical user interface on display screen 130 includes display of content G, which caused the alert notification to the user 108.

Further, in a manner as previously discussed, the controller 140 learns that the remote management system 160 is set to an operational mode in which the display screen displays a list of available content on display screen 130, and especially the user's favorite program.

The controller 140 maps the current operational mode to an appropriate entry such as entry 430 in the map information 165 to determine which of the multiple keys of keypad 102 to illuminate. In this instance, the map information 165 indicates to back illuminate (using a common color such as green) the grouping of multiple keys including the arrow keys 121, 122, 123, and 124 as well as select key 131, etc. Via these backlit keys, the user 108 is able to navigate the graphical user interface and select content G for playback.

Further Embodiments

Note that subsequent to selectively back-illuminating an appropriate group of multiple selectable control buttons for an amount of time on the remote controller device 120, the controller 140 can be configured to temporarily deactivate the first group of multiple selectable control buttons (such as select key 131, up arrow key 121, down arrow key 123, left arrow key 124, right arrow key 122, jump forward key 222, fast-forward key 232, INFO key, etc.) to conserve power consumption by the remote controller device 120.

During such a backlight deactivation condition, the controller 140 can be configured to monitor, via a respective motion sensor, movement of the remote controller device 120 handled by the user 108. In one embodiment, the controller 140 is operable to deactivate the first group of multiple selectable control buttons OFF in response to detecting that the remote controller device 120 has not moved for a predetermined amount of time. Detecting lack of movement means that the remote controller device 120 is likely resting on a respective stationary surface and that the remote controller device 120 is not currently being used by the user 108 to control the remote media system 160.

In response to detecting motion of the remote controller device 120 again, after being in a sleep or backlight deactivation mode, assuming there has been no operational mode change with respect to the remote media system 160, the controller 140 selectively back-illuminates the first group of multiple selectable control buttons associated with the current operational mode again (such as select key 131, up arrow key 121, down arrow key 123, left arrow key 124, right arrow key 122, jump forward key 222, fast-forward key 232, INFO key, etc.) while simultaneously deactivating back-illumination of a second group of multiple selectable control buttons that are not pertinent to the current operational mode. In such an instance, the user 108 is again informed of the relevant buttons to control the remote media system 160 after backlighting has been temporarily deactivated.

Figure 11:
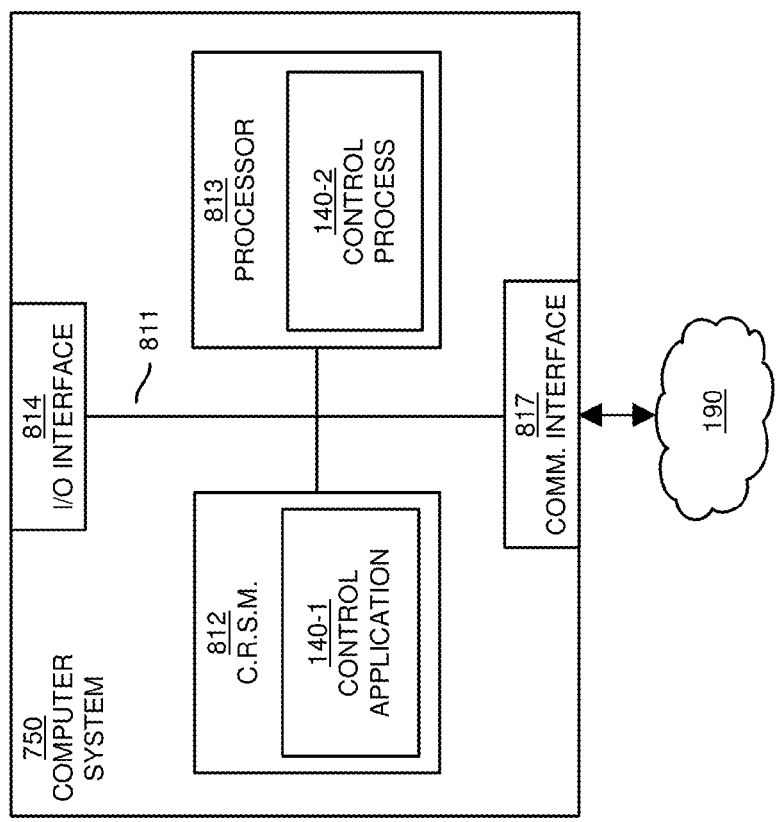
FIG. 11 is an example diagram illustrating a computer architecture in which to execute one or more embodiments as discussed herein.

FIG. 11 is an example block diagram of a computer system for implementing any of the operations as discussed herein according to embodiments herein.

Any of the resources (e.g., remote controller device 120, remote media system 160, etc.) can be configured to include a processor and executable instructions to carry out the different operations as discussed herein.

As shown, computer system 750 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with control application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in control application 140-1 stored on computer readable storage medium 812. Execution of the control application 140-1 produces control process 140-2 to carry out any of the operations and/or processes as discussed herein.

Those skilled in the art will understand that the computer system 750 can include other processes and/or software and hardware components, such as an operating system that controls allocation and use of hardware resources to control application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 750 may reside at any location or can be included in any suitable resource in any network environment to implement functionality as discussed herein.

Functionality supported by the different resources will now be discussed via flowcharts in FIGS. 12-14. Note that the steps in the flowcharts below can be executed in any suitable order.

Figure 12:
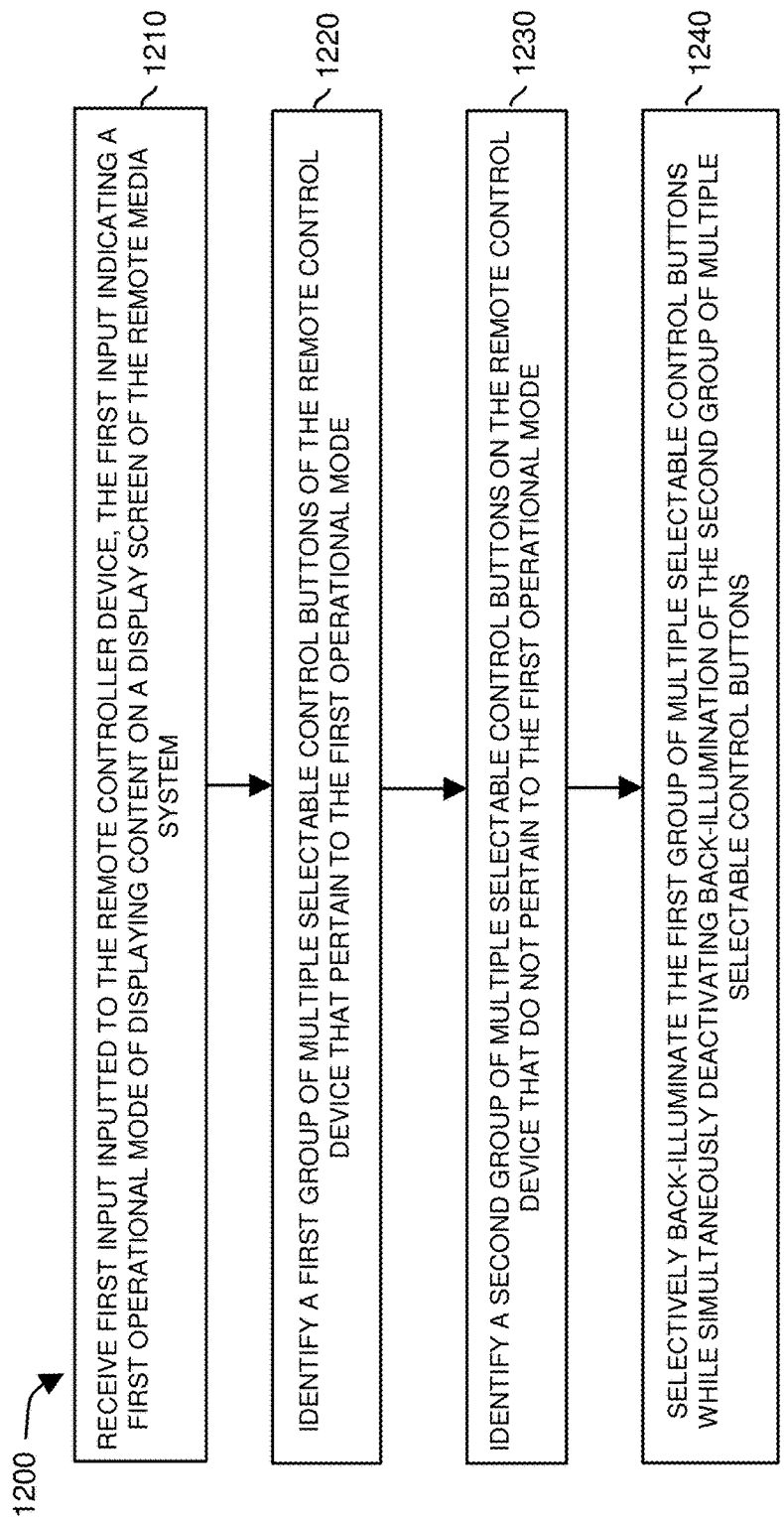
FIG. 12 is an example diagram illustrating a method according to embodiments herein.

FIG. 12 is a flowchart 1200 illustrating an example method according to embodiments. Note that there will be some overlap with respect to concepts as discussed above.

In processing operation 1210, the controller 140 receives first input inputted to the remote controller device 120. The first input indicates a first operational mode such as display of particular content on a display screen 130 of the remote media system 310.

In processing operation 1220, the controller 140 identifies a first group of multiple selectable control buttons of the remote controller device that pertain to the first operational mode.

In processing operation 1230, the controller 140 identifies a second group of multiple selectable control buttons on the remote controller device that do not pertain to the first operational mode.

In processing operation 1240, the controller 140 selectively back-illuminates the first group of multiple selectable control buttons while simultaneously deactivating back-illumination of the second group of multiple selectable control buttons.

Figure 13:
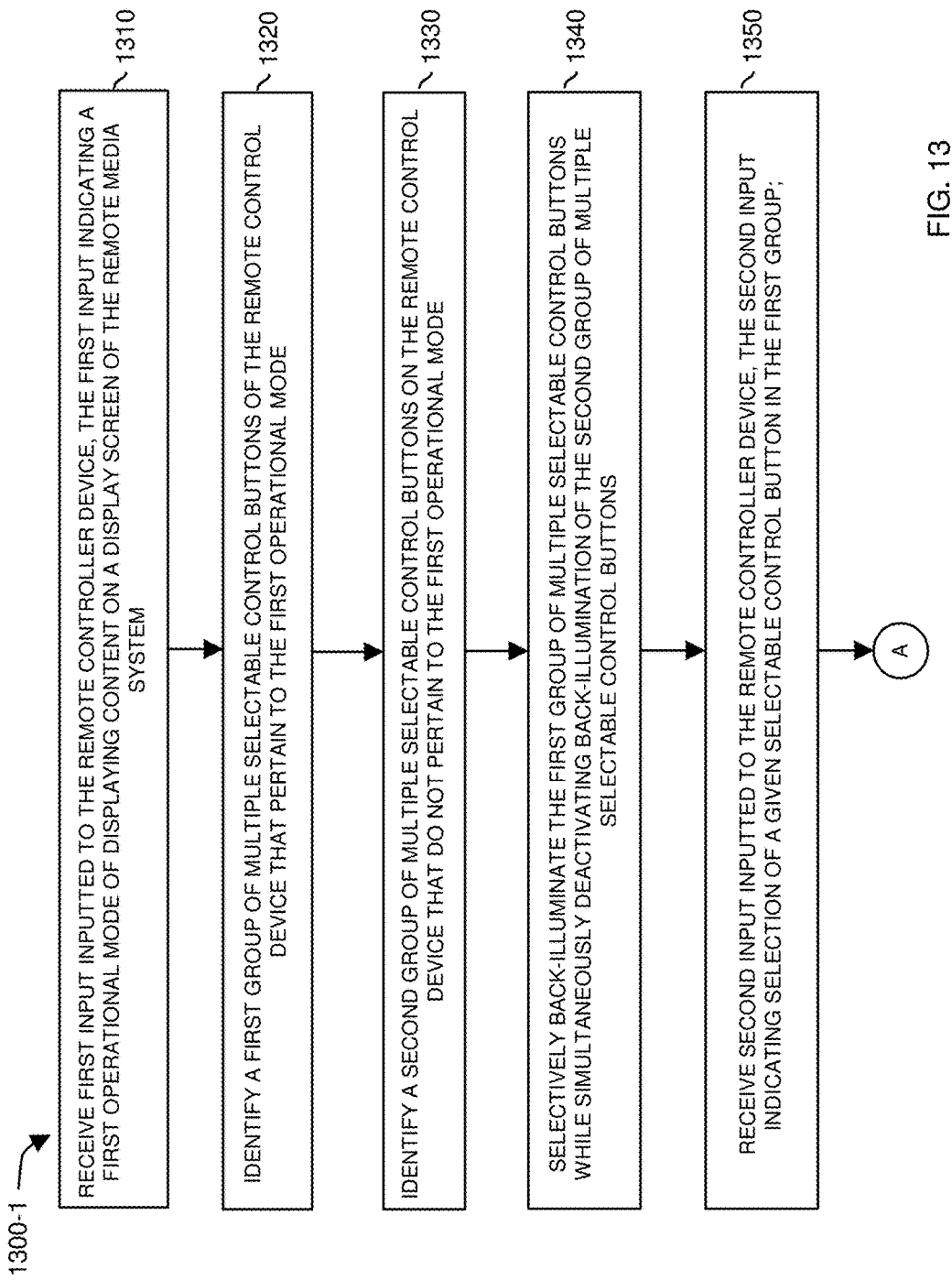

FIGS. 13 and 14 combine to form a flowchart 1300 (flowchart 1300-1 and flowchart 1300-2) illustrating an example method according to embodiments. Note that there will be some overlap with respect to concepts as discussed above.

In processing operation 1310 of flowchart 1300-1 (FIG. 13), the controller 140 receives first input inputted to the remote controller device 120. The first input indicates a first operational mode of displaying content on a display screen 130 of the remote media system 160. As previously discussed, the first input can be received from any suitable resource.

In processing operation 1320, the controller 140 identifies a first group of multiple selectable control buttons on the keypad 102 of the remote controller device 120 that pertain to the first operational mode associated with the remote media system 160.

In processing operation 1330, the controller 140 identifies a second group of multiple selectable control buttons on the keypad 102 of the remote controller device 120 that do not pertain to the first operational mode.

In processing operation 1340, the controller 140 selectively back-illuminates the first group of multiple selectable control buttons while simultaneously deactivating back-illumination of the second group of multiple selectable control buttons.

In processing operation 1350, the controller 140 receives second input inputted to the remote controller device 120; the second input indicates selection of a given selectable control button in the first group.

In processing operation 1410 of flowchart 1300-2 (FIG. 14), in response to receiving the selection of a given selectable control button in the first group, the controller 140: i) maps the selection of the given selectable control button in the first group to a corresponding command pertaining to the first operational mode, and ii) wirelessly transmits the corresponding command from an output interface of the remote controller device 120 to the remote media system 160.

In processing operation 1420, the controller 140 receives third input indicating a second operational mode of the remote media system 160 as selected by the corresponding command.

In processing operation 1430, the controller 140 identifies a third group of multiple selectable control buttons of the remote controller device 120 that pertain to the second operational mode.

In processing operation 1440, the controller 140 identifies a fourth group of multiple selectable control buttons on the remote controller device 120 that do not pertain to the second operational mode.

In processing operation 1450, the controller 140 selectively back-illuminates the third group of multiple selectable control buttons on the keypad 102 while simultaneously deactivating back-illumination of the fourth group of multiple selectable control buttons on the keypad 102. The back-illumination of the third group of multiple selectable control buttons indicates that the third group of multiple selectable control buttons are used to control the remote media system 160 while in the second operational mode.

Accordingly, embodiments herein include selectively back illuminating different groupings of keys of the remote controller device 120 to indicate which of the keys are relevant to controlling the current operational mode of the target one or more devices being controlled.

Note again that techniques herein are well suited to facilitate remote control of a one or more remote target devices in a subscriber domain. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   at a remote controller device operated by a user controlling a remote media system:
      receiving first input inputted to the remote controller device, the first input indicating a first operational mode of displaying content on a display screen of the remote media system;
      identifying a first group of multiple selectable control buttons of the remote controller device that pertain to the first operational mode;
      identifying a second group of multiple selectable control buttons on the remote controller device that do not pertain to the first operational mode; and
      selectively back-illuminating the first group of multiple selectable control buttons while simultaneously deactivating back-illumination of the second group of multiple selectable control buttons;
      wherein receiving the first input includes receiving selection of a particular selectable control button of the multiple selectable control buttons, the multiple selectable control buttons disposed on a facing of the remote controller device, selection of the particular selectable control button controlling the remote media system to the first operational mode via transmission of a wireless signal communicated from the remote controller device to the remote media system.

2. The method as in claim 1 further comprising:
receiving second input inputted to the remote controller device, the second input indicating selection of a given selectable control button in the first group;
in response to receiving the selection of the given selectable control button in the first group:
   mapping the selection of the given selectable control button in the first group to a corresponding command pertaining to the first operational mode; and
   wirelessly transmitting the corresponding command from an output interface of the remote controller device to the remote media system.

3. The method as in claim 2 further comprising:
receiving third input indicating a second operational mode of the remote media system as selected by the corresponding command;
identifying a third group of multiple selectable control buttons of the remote controller device that pertain to the second operational mode;
identifying a fourth group of multiple selectable control buttons on the remote controller device that do not pertain to the second operational mode; and
selectively activating back-illuminating the third group of multiple selectable control buttons while simultaneously deactivating back-illumination of the fourth group of multiple selectable control buttons, back-illumination of the third group of multiple selectable control buttons indicating that the third group of multiple selectable control buttons are used to control the remote media system while in the second operational mode.

4. The method as in claim 1 further comprising:
back-illuminating the multiple selectable control buttons using different colored light to indicate to which of multiple different devices in the remote media system each of the multiple selectable control buttons pertains.

5. The method as in claim 1, further comprising:
during an operation of selectively back-illuminating the first group of multiple selectable control buttons while simultaneously deactivating back-illumination of the second group of multiple selectable control buttons:
   back-illuminating the first group of multiple selectable control buttons using a first color of light to indicate that the first group of multiple selectable control buttons are selectable to control the first operational mode of controlling the remote media system; and
   back-illuminating the particular selectable control button using a second color of light to indicate that the particular selectable control button was previously selected by the user of the remote controller device to select the first operational mode in which the remote media system is currently set.

6. A method comprising:
at a remote controller device operated by a user controlling a remote media system:
   receiving first input inputted to the remote controller device, the first input Indicating a first operational mode of displaying content on a display screen of the remote media system;
   identifying a first group of multiple selectable control buttons of the remote controller device that pertain to the first operational mode;

identifying a second group of multiple selectable control buttons on the remote controller device that do not pertain to the first operational mode; and selectively back-illuminating the first group of multiple selectable control buttons while simultaneously deactivating back-illumination of the second group of multiple selectable control buttons;

subsequent to selectively back-illuminating the first group of multiple selectable control buttons for an amount of time, deactivating the first group of multiple selectable control buttons to conserve power; and in response to detecting motion of the remote controller device, selectively back-illuminating the first group of multiple selectable control buttons again while simultaneously deactivating back-illumination of the second group of multiple selectable control buttons.

7. A method comprising:

at a remote controller device operated by a user controlling a remote media system:

receiving first input inputted to the remote controller device, the first input indicating a first operational mode of displaying content on a display screen of the remote media system;

identifying a first group of multiple selectable control buttons of the remote controller device that pertain to the first operational mode;

identifying a second group of multiple selectable control buttons on the remote controller device that do not pertain to the first operational mode;

selectively back-illuminating the first group of multiple selectable control buttons while simultaneously deactivating back-illumination of the second group of multiple selectable control buttons; and wherein receiving the first input includes receiving wireless feedback from the remote media system indicating that the remote media system is currently set to the first operational mode.

8. A method comprising:

at a remote controller device operated by a user controlling a remote media system:

receiving first input inputted to the remote controller device, the first input indicating a first operational mode of displaying content on a display screen of the remote media system;

identifying a first group of multiple selectable control buttons of the remote controller device that pertain to the first operational mode;

identifying a second group of multiple selectable control buttons on the remote controller device that do not pertain to the first operational mode;

selectively back-illuminating the first group of multiple selectable control buttons while simultaneously deactivating back-illumination of the second group of multiple selectable control buttons; and while selectively back-illuminating the first group of multiple selectable control buttons and simultaneously deactivating back-illumination of the second group of multiple selectable control buttons, providing a visual indication indicating which particular selectable control button of the multiple selectable control buttons was selected by the user of the remote controller device to select the first operational mode, the visual indication distinguishing the particular selectable control button from the first group of multiple selectable control buttons and the second group of multiple selectable control buttons.

9. A method comprising:

at a remote controller device operated by a user controlling a remote media system:

receiving first input inputted to the remote controller device, the first input indicating a first operational mode of displaying content on a display screen of the remote media system;

identifying a first group of multiple selectable control buttons of the remote controller device that pertain to the first operational mode;

identifying a second group of multiple selectable control buttons on the remote controller device that do not pertain to the first operational mode; and selectively back-illuminating the first group of multiple selectable control buttons while simultaneously deactivating back-illumination of the second group of multiple selectable control buttons;

in response to receiving a wireless communication from the remote media system indicating completion of a background task by the remote media system, illuminating a particular selectable button on the remote controller device to indicate completion of the background task; and in response to receiving selection of the illuminated particular selectable button, transmitting a command from the remote controller device to the remote media system to operate the remote media system in a second operational mode instead of the first operational mode.

10. The method as in claim 9 further comprising:

identifying a third group of multiple selectable control buttons of the remote controller device that pertain to the second operational mode;

identifying a fourth group of multiple selectable control buttons on the remote controller device that do not pertain to the second operational mode; and selectively activating back-illumination of the third group of multiple selectable control buttons while simultaneously deactivating back-illumination of the fourth group of multiple selectable control buttons, back-illumination of the third group of multiple selectable control buttons indicating that the third group of multiple selectable control buttons are available to control the remote media system while in the second operational mode.

11. A method comprising:

at a remote controller device operated by a user controlling a remote media system:

receiving first input inputted to the remote controller device, the first input indicating a first operational mode of displaying content on a display screen of the remote media system;

identifying a first group of multiple selectable control buttons of the remote controller device that pertain to the first operational mode;

identifying a second group of multiple selectable control buttons on the remote controller device that do not pertain to the first operational mode; and selectively back-illuminating the first group of multiple selectable control buttons while simultaneously deactivating back-illumination of the second group of multiple selectable control buttons;

at the remote controller device:

detecting occurrence of an event occurring at the remote media system;

outputting an alert notification indicating the occurrence of the event; and in response to receiving input from the user selecting an alert notification key of the remote controller device associated with the alert notification, transmitting a respective command associated with the alert notification key as a wireless signal from the remote controller device to the remote media system, the selection of the alert key notifying the remote media system to perform a respective function associated with the alert notification key.

12. The method as in claim 11, wherein outputting the alert notification includes backlighting the alert notification key of the remote controller device to indicate the occurrence of the event.

13. The method as in claim 11, wherein outputting the alert notification includes outputting an audible signal from the remote controller device to indicate the occurrence of the event.

14. A remote controller device to wirelessly control a remote media system, the remote controller device comprising:
   multiple selectable control buttons;
   multiple optical sources, each of which individually back-illuminates a respective selectable control button of the multiple selectable buttons; and
   controller hardware operable to:
      selectively activate different groupings of the multiple optical sources depending upon a current operational mode of the remote media system, the current operational mode selected via input to the remote controller device; and
      provide a visual indication on the remote control device of the current operational mode;
   the remote controller device further comprising:
      a first wireless interface operable to transmit a wireless control signal to the remote media system, the controller hardware operable to produce the wireless control signal to include a command corresponding to pressing of the multiple selectable control buttons; and
      a second wireless interface operable to receive wireless communications from the remote media system, the wireless communications indicating the current operational mode of the remote media system.

15. The remote controller device as in claim 14, wherein the controller is further operable to:
   receive first input inputted to the remote controller device, the first input indicating a first operational mode of displaying content on a display screen of the remote media system;
   identify a first group of multiple selectable control buttons of the remote controller device that pertain to the first operational mode;
   identify a second group of multiple selectable control buttons on the remote controller device that do not pertain to the first operational mode; and
   selectively back-illuminate the first group of multiple selectable control buttons while simultaneously deactivating back-illumination of the second group of multiple selectable control buttons.

16. The remote controller device as in claim 14, wherein the controller hardware is further operable to:
   receive first input inputted to the remote controller device, the first input indicating a first operational mode of displaying content on a display screen of the remote media system;
   identify a first group of multiple selectable control buttons of the remote controller device that pertain to the first operational mode;
   identify a second group of multiple selectable control buttons on the remote controller device that do not pertain to the first operational mode;
   selectively back-illuminate the first group of multiple selectable control buttons while simultaneously deactivating back-illumination of the second group of multiple selectable control buttons; and
   produce the visual indication to indicate that the first group of multiple selectable control buttons pertain to the first operational mode.

17. The remote controller device as in claim 16, wherein the controller hardware is further operable to receive selection of a particular selectable control button of the multiple selectable control buttons, the multiple selectable control buttons disposed on a facing of the remote controller device, selection of the particular selectable control button controlling the remote media system to the first operational mode via transmission of a wireless signal communicated from the remote controller device to the remote media system.

18. The remote controller device as in claim 17, wherein the controller hardware is further operable to:
   during an operation of selectively back-illuminating the first group of multiple selectable control buttons while simultaneously deactivating back-illumination of the second group of multiple selectable control buttons:
      back-illuminate the first group of multiple selectable control buttons using a first color of light to indicate that the first group of multiple selectable control buttons are selectable to control the first operational mode of controlling the remote media system; and
      back-illuminate the particular selectable control button using a second color of light to indicate that the particular selectable control button was previously selected by a user of the remote controller device to select the first operational mode in which the remote media system is currently set.

19. The remote controller device as in claim 16, wherein the controller hardware is further operable to:
   in response to receiving a wireless communication from the remote media system indicating completion of a background task by the remote media system, illuminate a particular selectable button on the remote controller device to indicate completion of the background task.

20. The remote controller device as in claim 19, wherein the controller hardware is further operable to:
   in response to receiving selection of the illuminated particular selectable button, transmit a subsequent command from the remote controller device to the remote media system to operate the remote media system in a second operational mode instead of the first operational mode.

21. The remote controller device as in claim 20, wherein the controller hardware is further operable to:
   identify a third group of multiple selectable control buttons of the remote controller device that pertain to the second operational mode;
   identify a fourth group of multiple selectable control buttons on the remote controller device that do not pertain to the second operational mode; and
   selectively activate back-illumination of the third group of multiple selectable control buttons while simultaneously deactivating back-illumination of the fourth group of multiple selectable control buttons, back-illumination of the third group of multiple selectable control buttons indicating that the third group of multiple selectable control buttons are available to control the remote media system while in the second operational mode.

22. The remote controller device as in claim 16, wherein the controller hardware is further operable to:
   receive second input inputted to the remote controller device, the second input indicating selection of a given selectable control button in the first group;
   in response to receiving the selection of a given selectable control button in the first group:
      map the selection of the given selectable control button in the first group to a corresponding command pertaining to the first operational mode; and
      wirelessly transmit the corresponding command from an output interface of the remote controller device to the remote media system.

23. The remote controller device as in claim 22, wherein the controller hardware is further operable to:
   receive second input indicating a second operational mode of the remote media system as selected by the corresponding command;
   identify a third group of multiple selectable control buttons of the remote controller device that pertain to the second operational mode;
   identify a fourth group of multiple selectable control buttons on the remote controller device that do not pertain to the second operational mode; and
   selectively activate back-illuminating the third group of multiple selectable control buttons while simultaneously deactivating back-illumination of the fourth group of multiple selectable control buttons, back-illumination of the third group of multiple selectable control buttons indicate that the third group of multiple selectable control buttons are used to control the remote media system while in the second operational mode.

24. The remote controller device as in claim 16, wherein the controller hardware is further operable to:
   back-illuminate the multiple selectable control buttons using different colored light to indicate to which of multiple different devices in the remote media system each of the multiple selectable control buttons pertains.

25. The remote controller device as in claim 16, wherein the controller hardware is further operable to:
   subsequent to selectively back-illuminating the first group of multiple selectable control buttons for an amount of time, deactivate the first group of multiple selectable control buttons to conserve power; and
   in response to detecting motion of the remote controller device, selectively back-illuminate the first group of multiple selectable control buttons again while simultaneously deactivating back-illumination of the second group of multiple selectable control buttons.

26. The remote controller device as in claim 16, wherein the controller hardware is further operable to:
   while selectively back-illuminating the first group of multiple selectable control buttons and simultaneously deactivating back-illumination of the second group of multiple selectable control buttons, providing a visual indication indicating which particular selectable control button of the multiple selectable control buttons was selected by a user of the remote controller device to select the first operational mode, the visual indication distinguishing the particular selectable control button from the first group of multiple selectable control buttons and the second group of multiple selectable control buttons.

27. The remote controller device as in claim 16, wherein the controller hardware is further operable to receive wireless feedback from the remote media system indicating that the remote media system is currently set to the first operational mode.

* * * * *